(12) United States Patent
Markham

(10) Patent No.: US 7,536,715 B2
(45) Date of Patent: May 19, 2009

(54) DISTRIBUTED FIREWALL SYSTEM AND METHOD

(75) Inventor: Thomas R. Markham, Anoka, MN (US)

(73) Assignee: Secure Computing Corporation, San Jose, CA (US)

( * ) Notice: Subject to any disclaimer, the term of this patent is extended or adjusted under 35 U.S.C. 154(b) by 743 days.

(21) Appl. No.: 10/304,469

(22) Filed: Nov. 25, 2002

(65) Prior Publication Data

US 2003/0126468 A1 Jul. 3, 2003

Related U.S. Application Data

(63) Continuation of application No. PCT/US01/17153, filed on May 25, 2001.

(51) Int. Cl.
*G06F 9/00* (2006.01)
(52) U.S. Cl. .............................. 726/11; 726/12; 726/13; 713/153; 713/154; 709/238; 370/351
(58) Field of Classification Search ......... 713/151–155; 726/11–13; 709/238; 370/351
See application file for complete search history.

(56) References Cited

U.S. PATENT DOCUMENTS

| | | | |
|---|---|---|---|
| 5,557,742 A * | 9/1996 | Smaha et al. ................. | 726/22 |
| 5,748,736 A | 5/1998 | Mittra | |
| 5,758,069 A | 5/1998 | Olsen | |
| 5,889,958 A * | 3/1999 | Willens ...................... | 709/229 |
| 5,896,499 A | 4/1999 | McKelvey ............. | 395/187.01 |
| 5,898,784 A * | 4/1999 | Kirby et al. .................. | 713/153 |
| 5,915,008 A * | 6/1999 | Dulman ................. | 379/221.08 |
| 5,953,335 A | 9/1999 | Erimli et al. | |
| 5,968,176 A | 10/1999 | Nessett et al. ............... | 713/201 |
| 6,049,789 A | 4/2000 | Frison et al. | |

(Continued)

FOREIGN PATENT DOCUMENTS

EP          1024627          8/2000

(Continued)

OTHER PUBLICATIONS

Brenne, A. "Interface Cards, The Network Interface Card Provides the Physical Connection to the network", http://www.itarchitect.com/article NMG20000727S0005, Jan. 1, 1999.*

(Continued)

*Primary Examiner*—Kambiz Zand
*Assistant Examiner*—Tongoc Tran
(74) *Attorney, Agent, or Firm*—Schwegman, Lundberg & Woessner, P.A.

(57) ABSTRACT

A system and method for restricting packet transfer to a computer across a network, wherein the computer includes a network interface device coupled to the network and wherein the network interface device includes a packet filter. A security server is connected to the network. A packet is received at the network interface device and the network interface device determines if the packet is an authorized transaction. If the packet is not an authorized transaction, the packet is routed to the security server, where the security server determines whether the packet is an authorized transaction. If the security server determines that the packet is an authorized transaction, the network interface device is configured to accept similar transactions.

45 Claims, 11 Drawing Sheets

U.S. PATENT DOCUMENTS

| | | | |
|---|---|---|---|
| 6,055,429 A | 4/2000 | Lynch | |
| 6,079,020 A | 6/2000 | Liu | |
| 6,105,027 A | 8/2000 | Schneider et al. | |
| 6,134,327 A | 10/2000 | Van Oorschot | |
| 6,167,445 A | 12/2000 | Gai et al. | |
| 6,173,399 B1 | 1/2001 | Gilbrech et al. | |
| 6,182,226 B1 | 1/2001 | Reid et al. | |
| 6,195,751 B1 | 2/2001 | Caronni et al. | |
| 6,215,872 B1 | 4/2001 | Van Oorschot | |
| 6,223,286 B1 | 4/2001 | Hashimoto | |
| 6,226,748 B1 | 5/2001 | Bots et al. | |
| 6,226,751 B1 | 5/2001 | Arrow et al. | |
| 6,272,538 B1 | 8/2001 | Holden et al. | |
| 6,298,378 B1* | 10/2001 | Angal et al. | 709/223 |
| 6,298,445 B1* | 10/2001 | Shostack et al. | 726/25 |
| 6,363,154 B1 | 3/2002 | Peyravian et al. | |
| 6,463,474 B1* | 10/2002 | Fuh et al. | 709/225 |
| 6,546,546 B1 | 4/2003 | Van Doorn | |
| 6,611,863 B1 | 8/2003 | Banginwar | |
| 6,718,379 B1 | 4/2004 | Krishna et al. | |
| 6,823,462 B1 | 11/2004 | Cheng et al. | |
| 6,859,827 B2 | 2/2005 | Banginwar | |
| 6,944,183 B1 | 9/2005 | Iyer et al. | |
| 6,959,078 B1* | 10/2005 | Eilbacher et al. | 379/265.03 |
| 7,010,702 B1 | 3/2006 | Bots et al. | |
| 7,039,708 B1* | 5/2006 | Knobl et al. | 709/227 |
| 7,231,664 B2 | 6/2007 | Markham et al. | |
| 7,234,063 B1 | 6/2007 | Baugher et al. | |
| 7,246,232 B2 | 7/2007 | Dutertre | |
| 7,308,706 B2 | 12/2007 | Markham et al. | |
| 7,403,980 B2 | 7/2008 | Stringer-Calvert et al. | |
| 2002/0010798 A1 | 1/2002 | Ben-Shaul et al. | |
| 2002/0037736 A1 | 3/2002 | Kawaguchi et al. | |
| 2002/0055989 A1 | 5/2002 | Stringer-Calvert et al. | |
| 2002/0062333 A1* | 5/2002 | Anand et al. | 709/105 |
| 2002/0157024 A1 | 10/2002 | Yokote | |
| 2002/0164025 A1 | 11/2002 | Raiz et al. | |
| 2003/0055989 A1 | 3/2003 | Zamanzadeh et al. | |
| 2003/0126464 A1 | 7/2003 | McDaniel et al. | |
| 2003/0204722 A1 | 10/2003 | Schoen et al. | |
| 2003/0226013 A1 | 12/2003 | Dutertre | |
| 2005/0086300 A1 | 4/2005 | Yeager et al. | |
| 2006/0129792 A1 | 6/2006 | Bots et al. | |
| 2006/0198368 A1 | 9/2006 | Guichard et al. | |

FOREIGN PATENT DOCUMENTS

| | | |
|---|---|---|
| GB | 2356763 | 5/2001 |
| WO | WO-99/67931 | 12/1999 |
| WO | WO-0069145 A1 | 11/2000 |
| WO | WO-0078004 A3 | 12/2000 |

OTHER PUBLICATIONS

Elson, D. "Intrusion Detection, Theory and Practice", http://www.securityFocus.com/infocus/1203, Mar. 27, 2000.*

Mancill T., "Linux WAN Routers", Linux Journal, vol. 1998, Issue 50es (Jun. 1998).*

"Amendment and Response mailed May 21, 2007 in U.S. Appl. No. 10/304,469", 18 pgs.

"Amendment and Response mailed Aug. 22, 2006 in U.S. Appl. No. 10/304,469", 15 pgs.

"Amendment and Response to Final Office Action mailed Apr. 30, 2007 in U.S. Appl. No. 10/234,223", 12 pgs.

"Application U.S. Appl. No. 10/234,223 Non-Final Office Action mailed Mar. 7, 2006", 13.

"Application U.S. Appl. No. 10/281,843 Final office action mailed Dec. 13, 2006", 11 pgs.

"Application U.S. Appl. No. 10/281,843 Non Final office action mailed Jun. 28, 2006", 16 pgs.

"Application U.S. Appl. No. 10/281,843 Notice of allowance mailed Apr. 20, 2007", 7 pgs.

"Application U.S. Appl. No. 10/281,843 Response filed Sep. 28, 2006 to Non Final office action mailed Jun. 28, 2006", 19 pgs.

"Final office action mailed Oct. 30, 2006 in U.S. Appl. No. 10/234,233", 25 pgs.

"International Search Report mailed Jun. 10, 2002 in PCT Application No. PCT/US01/17153", 3 pgs.

"Non-Final Office Action mailed Nov. 21, 2006 in U.S. Appl. No. 10/304,469", 10 pgs.

"Non-Final Office Action Mailed Jul. 24, 2007 in U.S. Appl. No. 10/234,223 26 pgs", OARN,26.

"Non-Final Office Action mailed Sep. 29, 2006 in U.S. Appl. No. 10/234,224", 10 pgs.

"Notice of Allowance mailed Jan. 31, 2007 in U.S. Appl. No. 10/234,224", 9 pgs.

"Notice of Allowance mailed Oct. 4, 2007 in U.S. Appl. No. 10/281,843", NOAR,6 pgs.

"Office Action mailed Mar. 7, 2006 in U.S. Appl. No. 10/234,223", 13 pgs.

"Office Action mailed Jun. 13, 2006 in U.S. Appl. No. 10/304,469", 12 pgs.

"Office action response mailed Aug. 7, 2006 in U.S. Appl. No. 10/234,223", 19 pgs.

"Request for Continued Examination mailed Apr. 30, 2007 in U.S. Appl. No. 10/234,223", 18 pgs.

"Response filed Dec. 29, 2006 to non-final action mailed Sep. 29, 2006 in U.S. Appl. No. 10/234,224", 15 pgs.

"Response to Non-Final Office Action mailed Aug. 7, 2006 in U.S. Appl. No. 10/234,223", 19 pgs.

"Supplement Notice of Allowance mailed Apr. 3, 2007 in U.S. Appl. No. 10/234,224", 3 pgs.

Eli, H., "Secure Virtual Private networks: The Future of Data Communications", *International Journal of Network Management*, 9, (1999),213-220.

Harney, H., et al., "Group Secure Association Key Management Protocol", http://www.watersprings.org/pub/id/draft-harney-sparta-gsakmp-sec-02.txt, Internet Engineering Task Force,(Jun. 30, 2000),1-41.

McDaniel, P., et al., "Antigone: A Flexible Framework for Secure Group Communication", http://antigone.eecs.umich.edu/publications/usec99.pdf, (May 23, 1999),1-15.

McDaniel, P., et al., "Flexibly Constructing Secure Groups in Antigone 2.0", *DARPA Information Survivability Conference & Exposition II*, 2001. DISCEX '01. Proceedings, vol. 2. (Jun. 12, 2001),55-67.

Zao, J., et al., "Domain Based Internet Security Policy Management", http://www.ir.bbn.com/_{krash/pubs/zao_discex00.pdf, BBN Technologies Inc.,(Dec. 31, 1999),41-53.

"U.S. Appl. No. 10/234,223, Final Office Action mailed Feb. 22, 2008", FOAR, 27 pgs.

"U.S. Appl. No. 10/234,223 Response filed Nov. 26, 2007 to Office Action mailed Jul. 24, 2007.", 14 pgs.

"U.S. Appl. No. 10/234,223, Response filed Jul. 17, 2008 to Final Office Action mailed Feb. 22, 2008, 12 pgs."

"U.S. Appl. No. 10/234,223, Non-Final Office Action mailed Sep. 25, 2008", OARN, 24 pgs.

* cited by examiner

DISTRIBUTED FIREWALL SYSTEM AND METHOD

RELATED APPLICATIONS

This application is a continuation under 35 U.S.C. 111(a) of International Application No. PCT/US01/17153 filed May 25, 2001 and published in English as WO 01/91418 A2 on Nov. 29, 2001, which claimed priority from U.S. application Ser. No. 09/578,314 filed May 25, 2002 (now abandoned), which applications and publication are incorporated herein by reference.

FIELD OF THE INVENTION

The present invention is related to network security, and more particularly to a distributed system and method for enforcing a security policy.

BACKGROUND INFORMATION

The proliferation of computing platforms, and their connection to wide area networks such as the Internet, has led to increased susceptibility to malicious actions on the part of people both inside and outside an organization. Hackers and disgruntled employees have demonstrated the ability to penetrate computer resources and then use those resources in attacks on other networks.

For instance, hackers have taken over computer resources within organizations and used those resources to launch denial of service attacks on Internet content providers and on Internet merchants In the past, control of computer resources has been limited to firewall or other such protection at critical network borders. For instance, a firewall might be placed at an enclave border (such as the network connection to the Internet). The firewall then watches all the traffic coming into the enclave.

A majority of computer security problems are, however, caused by people who are already inside the enclave. Perimeter firewalls are not effective at addressing such problems. In addition, the establishment of a virtual private network between a host computer within the enclave and a computer outside the enclave can be used to frustrate the efforts of the perimeter firewall to review content passing in and out of the enclave.

Furthermore, dedicated firewalls are too expensive for homes and small businesses. Software firewalls have been proposed for providing firewall functionality to home and small business computers. Such systems have the fundamental problem that the security mechanism is built on operating systems which are themselves vulnerable to compromise.

Recently, integrated circuit technology has allowed the distribution of aspects of firewall protection to devices such as network interface cards (NICs), modems, repeaters, switches and routers. U.S. Pat. No. 5,968,176, issued Oct. 19, 1999 to Nessett et al. describes a way of configuring such devices in order to map a security policy restricting access to computer resources within the enclave across a heterogeneous group of security devices within the enclave.

Approaches such as that described by Nessett et al. reduce the load on perimeter firewalls by distributing aspects of the firewall to internal devices. They do this by determining the enclaves topology and mapping rules within the security policy to devices within the enclave. The rules mapped to a device are converted into configuration parameters associated with the device; the configuration parameters are then written to the device in order to implement the rule.

Such approaches do, however, have a drawback. They tend to be static implementations of rules and may, therefore, have difficulty adjusting to changing conditions. What is needed is a system and method of enforcing a security policy by distributing aspects of the security policy across a number of devices while retaining the ability to react to attacks and to changes in the computing environment.

SUMMARY OF THE INVENTION

The present invention provides a system and method for restricting packet transfer to a computer across a network, wherein the computer includes a network interface device coupled to the network and wherein the network interface device includes a packet filter. A security server is connected to the network. A packet is received at the network interface device and the network interface device determines if the packet is an authorized transaction. If the packet is not an authorized transaction, the packet is routed to the security server, where the security server determines whether the packet is an authorized transaction. If the security server determines that the packet is an authorized transaction, the network interface device is configured to accept similar transactions.

According to another aspect of the present invention, a system and method is described for restricting packet transfer from a computer across a network, wherein the computer includes a network interface device coupled to the network and wherein the network interface device includes a packet filter. A security server is connected to the network. A packet is received at the network interface device and the network interface device determines if the packet is an authorized transaction. If the packet is not an authorized transaction, the packet is routed to the security server, where the security server determines whether the packet is an authorized transaction. If the security server determines that the packet is an authorized transaction, the network interface device is configured to permit similar transactions. According to one aspect of the present invention, determining, at the network interface device, whether the packet is an authorized transaction at the network interface device includes comparing the source address to the host address.

According to yet another aspect of the present invention, a system and method is described for limiting source spoofing in the transfer of packets from a computer across a network. A computer includes a network interface device coupled to the network, wherein the computer has a computer address and wherein the network interface device includes a packet filter. A packet is transferred from the computer to the network interface device, wherein the packet includes a source address. The packet is examined within the network interface device, wherein examining includes comparing the source address to the computer address. If the source address matches the computer address, placing the packet on the network.

According to yet another aspect of the present invention, a computer system includes a network, a computer connected to the network through a network interface device and a security server. The network interface device includes logic for transmitting information from the network interface device to the security server independent of the computer. The security server configures the network interface device as a function of the transmitted information.

According to yet another aspect of the present invention, a computer system includes a network, a computer connected to the network, a router connected to the network and a security server. The router includes a packet filter. The router receives packets from the network, filters the packets using the packet filter to detect unauthorized packets and transmits unauthorized packets to the security server independent of the computer. The security server configures the router packet filter after analysis of the unauthorized packets.

According to yet another aspect of the present invention, a computer system includes a network, a computer connected to the network through a network interface device and a security server capable of communicating with the network interface device. The network interface device includes a packet filter, wherein the packet filter includes quality of service control for managing traffic flowing through the network interface device. The security server transfers configuration information to the network interface device to modify quality of service parameters on the network interface device as a function of changing security conditions within the computer system.

According to yet another aspect of the present invention, a distributed firewall system includes a plurality of computers, including a first computer, wherein the plurality of computers are connected through network interface cards to a network. The system also includes a security server connected to the network and the network interface card for the first computer includes logic which selectively forwards packets addressed to the first computer from the network interface card to the security server.

According to yet another aspect of the present invention, system and method is described for providing computer security services to the computer of a remote user. A security server is provided and a network interface device is installed in the computer. The network interface device includes logic for transmitting information from the network interface device to the security server independent of the computer. Information is transferred from the network interface device to the security server and the network interface device is configured as a function of the information transmitted from the network interface device to restrict packet transfer to the network interface device.

According to yet another aspect of the present invention, system and method is described for providing computer security services to the computer of a remote user. A security server is provided and a network interface device is installed in the computer. The network interface device includes a packet filter and logic for transmitting information from the network interface device to the security server independent of the computer. Information is transferred from the network interface device to the security server and the network interface device is configured as a function of the information transmitted from the network interface device to restrict packet transfer to the network interface device, wherein configuring the network interface device includes transferring packet filtering rules from the security server to the network interface device, wherein transferring includes modifying the packet filtering rules as a function of changing security conditions.

DESCRIPTION OF THE PREFERRED EMBODIMENTS

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the following detailed description are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, discussions utilizing terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Figure 1:
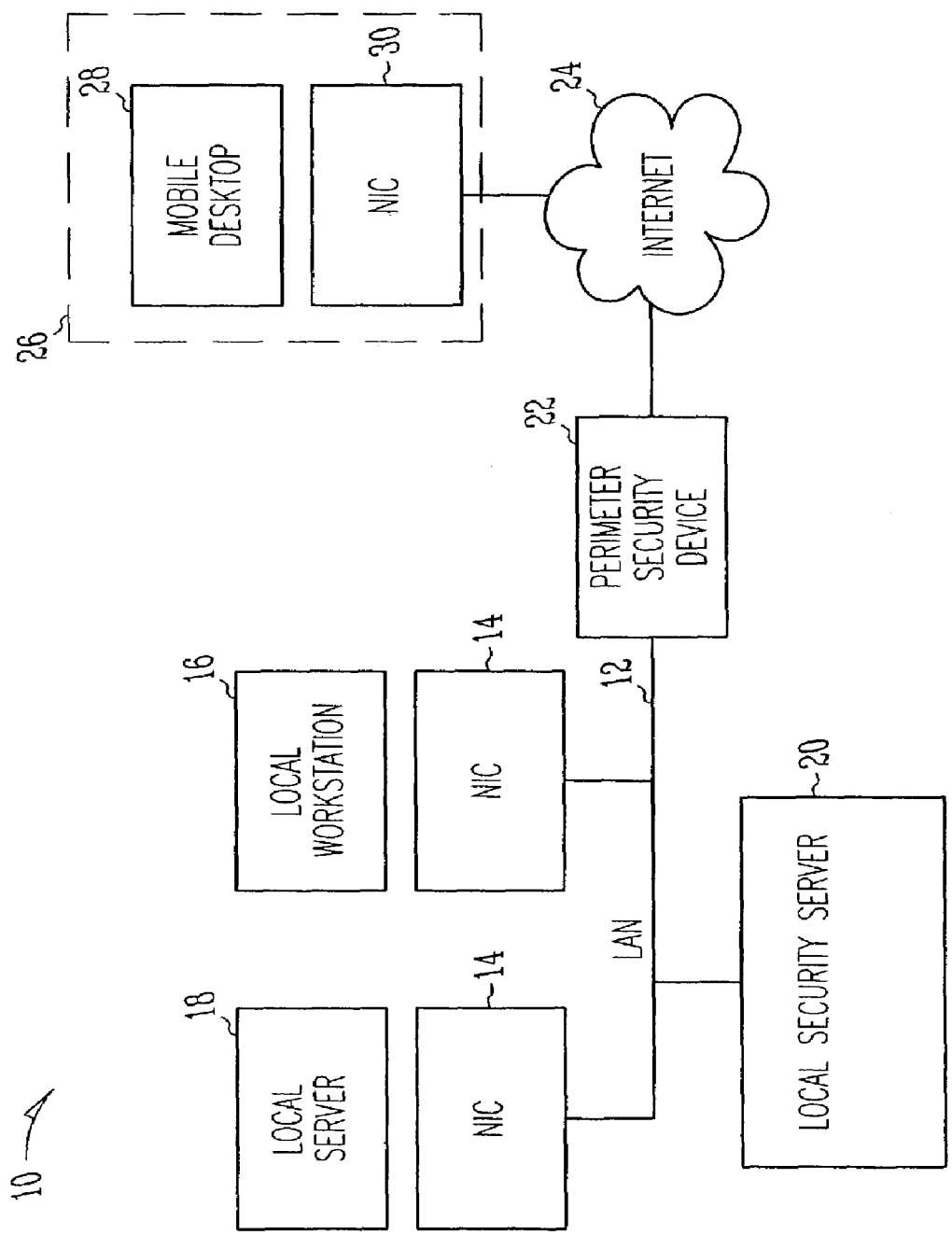
FIGS. 1-5 illustrates various embodiments of a distributed firewall system.

One embodiment of a distributed firewall system 10 is illustrated in FIG. 1. In one such embodiment network interface cards (NICs) 14 provide an interface between workstations 16 and network 12 and between servers 18 and network 12. System 10 also includes a local security server (LSS) 20 connected to network 12. Network interface cards 14 provide a host-based response and enforcement mechanism while local security server 20 provides centralized management of NICs 14 and a single system interface to intrusion detection and response systems.

Because the NICs 14 exist on each host and are managed independently from the host, they represent a "smart infobomb" capability. If a particular host has been compromised and can no longer be trusted, LSS 20 can tell the NIC on that host to not allow any more network traffic either to or from the host. If a particular source of an attack has been identified, LSS 20 can tell all of the NICs 14 to not accept any more traffic from that source. If the network is undergoing a denial of service attack, LSS 20 configures the NICs 14 in order to prioritize traffic from their host such that only critical traffic is routed to network 12.

As noted above, hackers have taken over computer resources within organizations and used those resources to launch denial of service attacks on Internet content providers and on Internet merchants. In one embodiment, NIC 14 uses proactive policies to minimize the chance that a compromised host could be used to launch a denial of service attack.

For instance, many denial of service attacks rely upon the attacking host spoofing its IP address so that the victim cannot easily trace back to find the attacker. In one embodiment, NIC 14 implements a simple policy that prevents a host from sending a packet unless the source address matches the address of the host. Thus, the host cannot spoof IP addresses. All packets sent from the attacking host to the victim contain addresses that point directly back to the attacker. Thus, the NIC does for denial of service attacks what caller ID has done to crank phone calls.

As noted above, current network security is based on firewalls at the boundary and relies on host security mechanisms within the enclave. This has been described, accurately, as a hard exterior with a soft, chewy center. Once an attacker has penetrated the firewall, they need only defeat host security mechanisms, an all too easy task since COTS systems have wide-spread, well-known holes. A system such as is shown in FIG. 1 presents a new, cost-effective firewall paradigm based on distributing the firewall functionality to independent components on each host system and then providing centralized management of the resulting distributed firewall that is integrated and coordinated with autonomic response systems.

In one embodiment, system 10 uses a master/slave architecture in which complex functions are performed on the master (LSS 20) while the fast, simple security enforcement is performed on the slave NIC 14. In one embodiment, LSS 20 provides relatively complex high level functions such as user interface, public key infrastructure operations, application layer filtering, intrusion detection management, and remote management of each network interface card 14. For instance, in one embodiment, LSS 20 provides a centralized security management interface, user/node authentication, key management and high level security policy decisions. In one embodiment, LSS 20 also includes audit and intrusion detection analysis capability.

In one master/slave architecture, NIC 14 performs packet filtering, packet encryption/decryption, and makes requests to LSS 20 for higher level security services.

In one embodiment, system 10 places the host-based firewall functionality on industry standard network cards 14. NICs 14 with packet filtering and packet encryption/decryption capability are currently available from companies like 3Com. The local security server (LSS) 20 is then used to provide management and to serve as the interface between the distributed firewall components and intrusion detection (ID) and autonomic response systems.

System 10, therefore, provides a response capability that current firewalls and COTS operating systems cannot. At the same time, by distributing the firewall mechanism across many security devices, system 10 is capable of providing high throughput.

System 10 can be extended to support mobile applications. In one embodiment, system 10 includes a perimeter security device 22 connected between network 12 and a mobile system 26. In one such embodiment, mobile system 26 includes a mobile computer 28 and a network interface device 30. Network interface device 30 may include a NIC such as NIC 14, or may be a modem, or other such interconnect device. As such system 10 provides both the high bandwidth and high connectivity needed for global interconnectivity.

Figure 2:
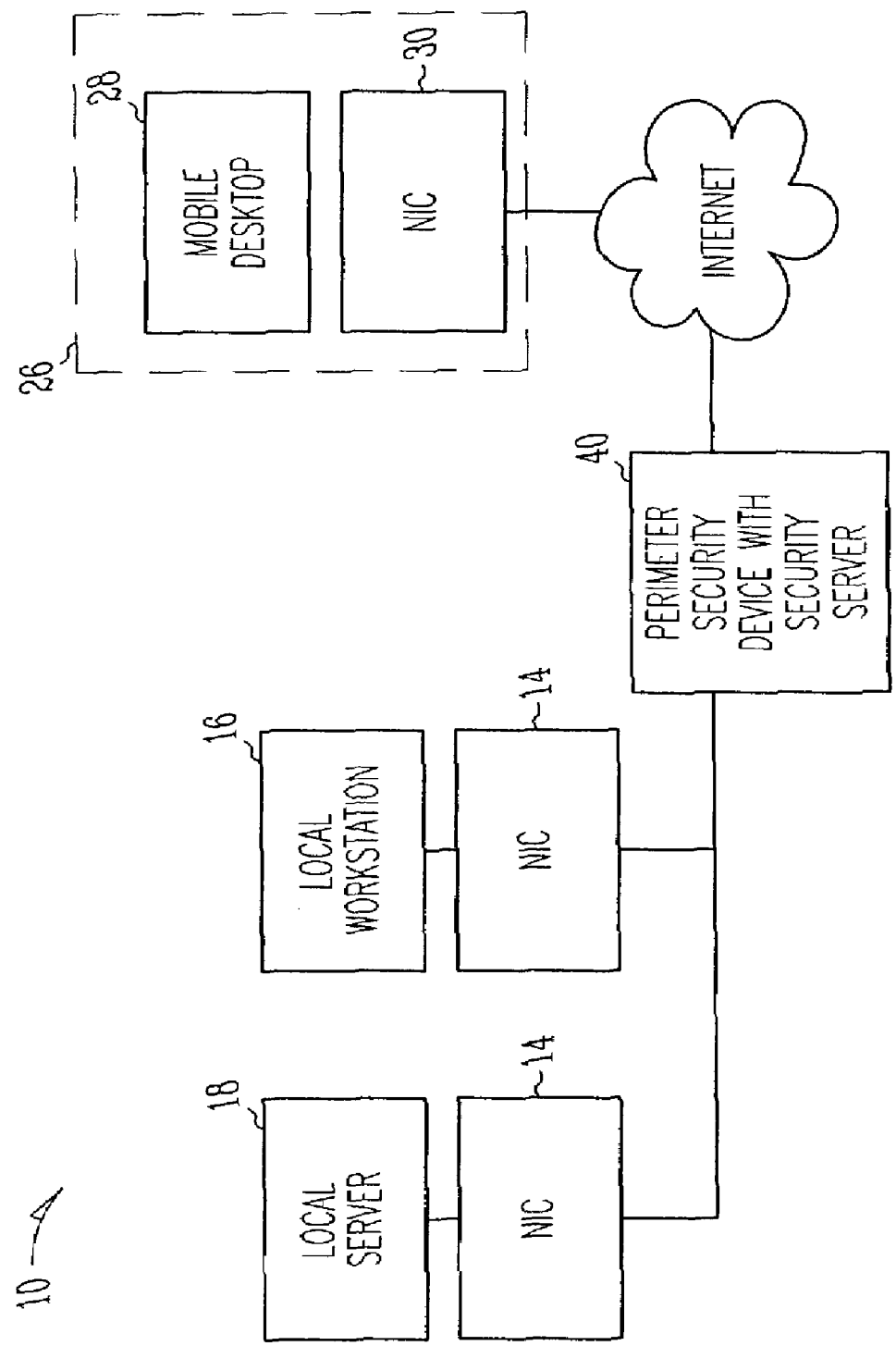

In one embodiment, the perimeter security function and the local security server function are performed on the same computing platform. One such embodiment is shown in FIG. 2, where device 40 provides both the perimeter security and local security server function.

Figure 3:
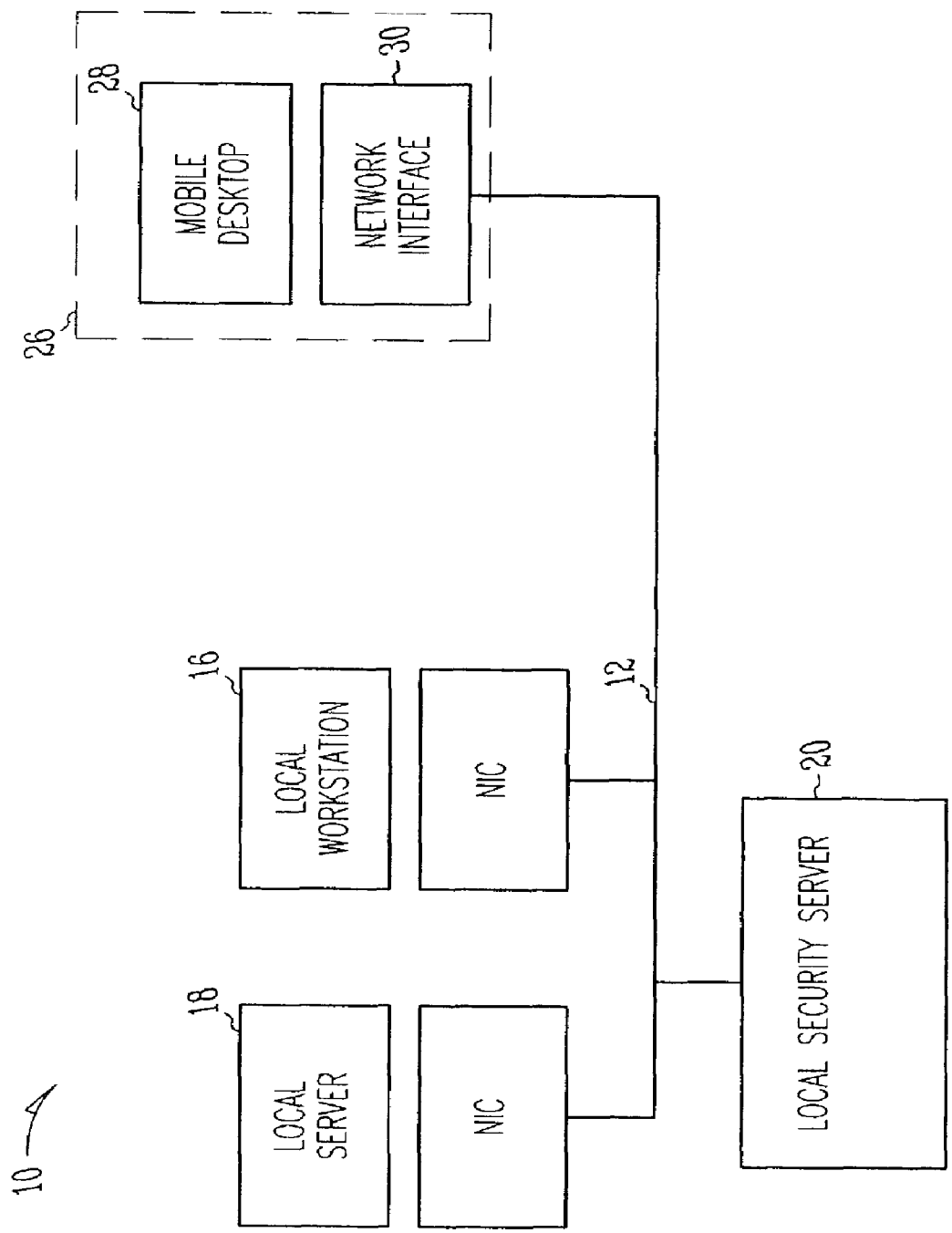

In another embodiment, such as is shown in FIG. 3, device 30 communicates with LSS 20 over a communications medium attached to network 12 (e.g., a telecommunications line or the Internet).

Figure 4:
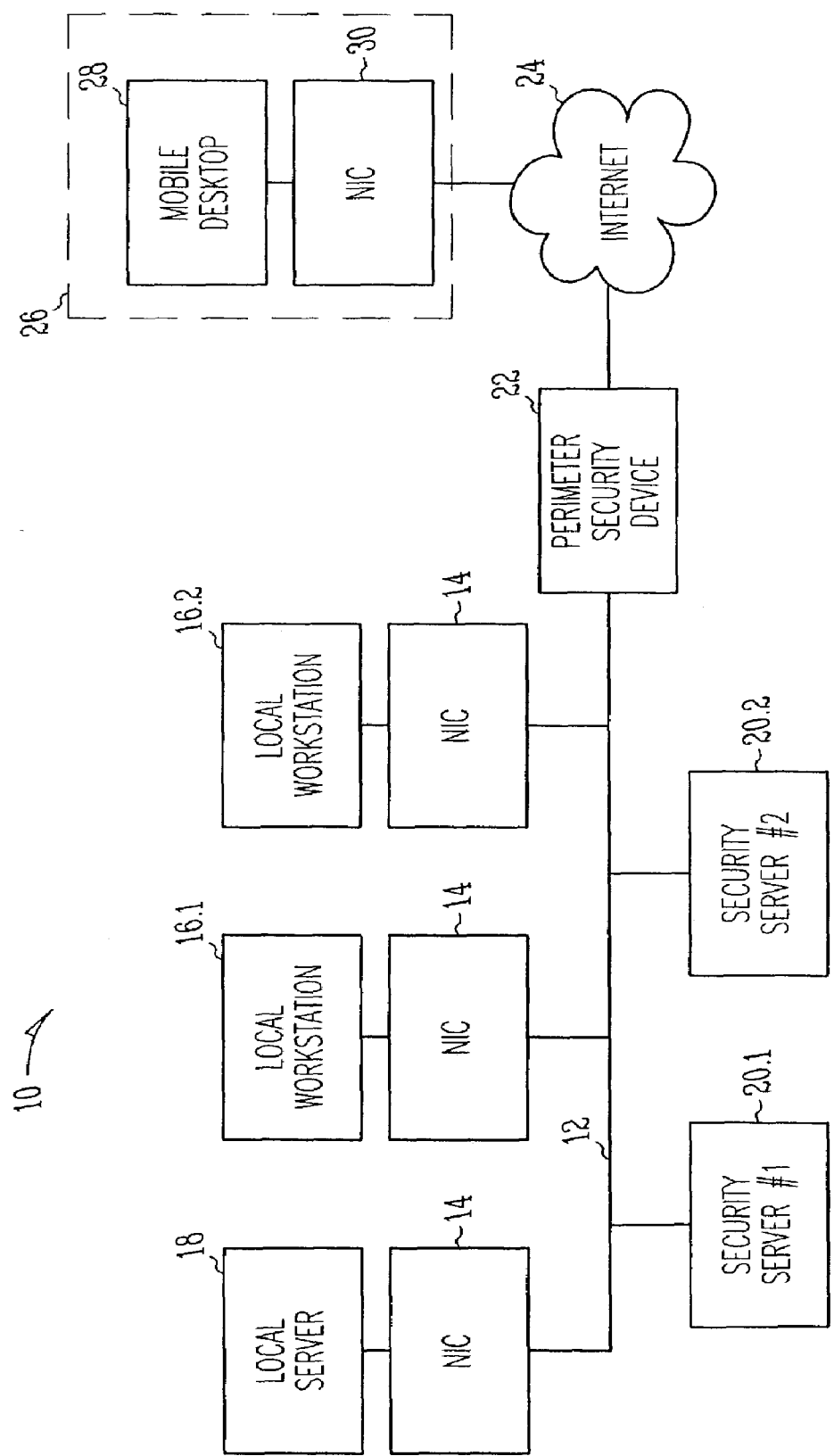

In yet another embodiment, such as is shown in FIG. 4, a subset of NICs 14 looks to LSS 20.1 as their local security server while another set of NICs 14 looks to LSS 20.2 as their security server. For example, the NIC 14 associated with workstation 16.2 and the device 30 associated with platform 26 may look to LSS 20.1 as their security server while the NICs 14 associated with workstation 16.1 and server 18 may look to LSS 20.1 as their security server.

System 10 provides a host-based, independent response mechanism that can be managed in coordination with other response mechanisms. System 10 accomplishes this by separating the access control enforcement mechanism (NIC 14, device 30) from the authentication, authorization, and audit analysis device (LSS 20 or 40). Such an approach allows easy integration of security into existing network topologies but frees the enforcement mechanism from reliance on trusted operating systems or users. Finally, system 10 is scalable (more processors (NICs) are added as the number of nodes grows) and supports distributed computing (for example, the mobile user can be protected much like users behind a firewall are protected today).

In one embodiment, network security functions (intrusion detection, IPSEC, packet filtering, access control, etc.) are localized in each NIC 14. Such an embodiment supports IPSEC to the desktop while still performing meaningful packet inspection and application layer policy enforcement.

The architectures shown in FIGS. 1-4 are also suitable for dynamic coalition environments. For example, a coalition partner may require access to information stored on a few servers within an enclave that also contains information on other servers that they are not authorized to see. In one embodiment, IPSEC connections are established with only the accessible servers; filtering policies are installed on all hosts to ensure that the coalition partner can only connect to the accessible servers.

A distributed firewall architecture using NICs 14 and LSSs 20 provides many benefits. IPSEC and IP filters on each NIC 14 can be used to provide efficient host-to-host encryption services and enforce host specific connection policies within the enclave as well as externally. In addition, each LSS 14 provides a well-defined, single interaction point between the NICS and autonomic response systems and so can ensure a coordinated, system-wide response.

Furthermore, NICs 14 are managed independently of the host on which they reside. If a host has been compromised, NIC 14 is used to isolate the host from the rest of network 12.

In addition, content filtering can be performed by having each NIC 14 redirect suspicious attachments to LSS 20 for filtering prior to allowing the attachment onto the host system.

In one embodiment, bandwidth management is performed by each NIC 14 based on direction from LSS 20.

The result is an autonomic distributed firewall (ADF) response mechanism for fast, host-based responses.

As noted above, system 10 provides a host resident response mechanism that operates and is managed independently of the host. This represents a new type of response mechanism that effectively distributes firewall functionality within an enclave. As current firewall architectures run-up against technical challenges in filtering and controlling new and more powerful applications and protocols, it is becoming more and more obvious that firewall perimeter control is not sufficient. The master/slave architecture of system 10 addresses this problem and provides the ability to respond quickly and precisely to intrusions even when internal network 12 is already compromised.

In one embodiment, system 10 can be configured to provide a response mechanism that provides quality of service control as well as network access control.

Current response mechanisms provide little to no capability against denial of service attacks that are based on network flooding. By using NICs 14 and devices 30 that support priority based quality of service, system 10 is able to manage the amount and type of traffic that flows on network 12 through those devices. As noted above, system 10 can be configured to support end-to-end IPSEC. Since IPSEC connections are centrally controlled by LSS 20, they can be initiated as needed to prevent or respond to possible attacks.

System 10 supports mobile, small office, and wireless users. Putting the response mechanism on network interface device 30 means that it is always present when a network connection is made. In fact, as is shown in FIG. 3, in one embodiment, network interface device 30 bypasses perimeter security device 22 to connect directly to network 12 under control of LSS 20.

Similarly, as noted above, and as is shown in FIG. 4, the local security function may be distributed across two or more platforms such as 20.1 and 20.2. In one embodiment, NIC 14.1 receives configuration information through a secure link from security server 20.1, while NICs 14.2 and device 30 receive their configuration information through a secure link from security server 20.2.

Figure 5:
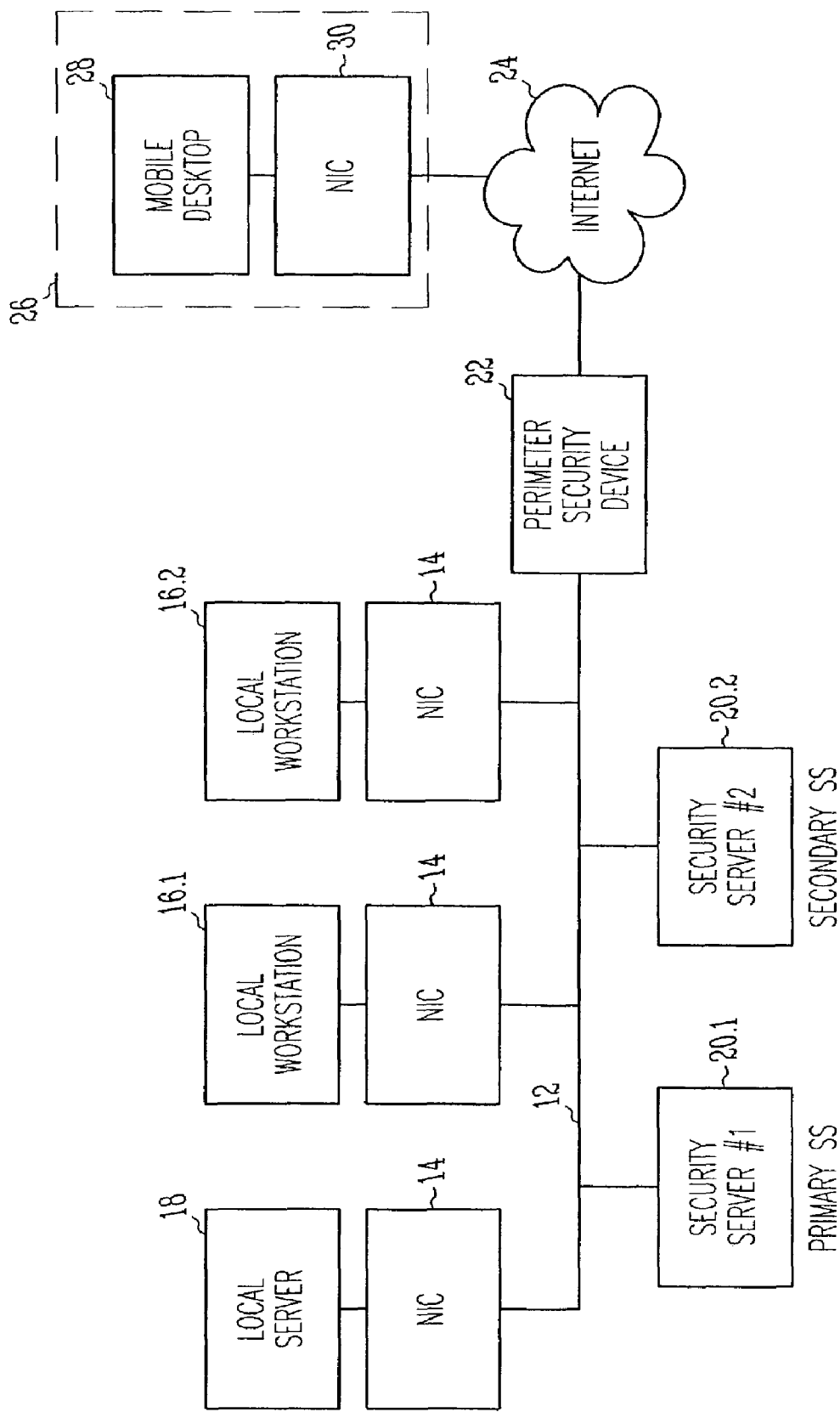

In yet another embodiment, as is shown in FIG. 5, one of the local security servers 20 is designated as the primary security server, while one or more others are treated as backups. If a NIC's primary LSS becomes unreachable, the NIC switches to the next in a list of available hosts. In one such embodiment, this list is contained in the configuration information downloaded to each NIC by their respective LSSs.

The embodiments shown in FIGS. 1-5 are useful for the extension of firewall-type protection to mobile users, or to small offices and homes offices (SOHO).

System 10 provides a centralized management component that allows coordinated responses across the enterprise. That is, since LSS 20 manages security across all of system 10, it can deploy responses simultaneously to all hosts with ADF NICs installed.

In one embodiment, each network interface card 14 acts as an enforcement and response mechanism for its particular host. In one such embodiment NIC 14 provides end-to-end IPSEC encryption, packet filtering of all traffic to and from the host, host-based ID reporting (especially for network traffic it has decrypted), Quality of Service (QoS) bandwidth management by prioritizing traffic sent from the host and redirection of suspicious traffic to LSS 20 for content filtering. Each function will be discussed in greater detail below.

Packet filtering on the NIC, rather than on or within the host operating system, prevents others from subverting the host operating system in order to compromise the firewall capability. In addition, the ability of the NIC to shunt packets to the master for such functions as application layer filtering and processing adds an additional layer of security to the distributed firewall system. Finally, by running distributed firewall functions on each NIC 14 or device 30, rather than its attached host, one gains operating system independence. That is, the NIC can be inserted into hosts running operating systems as diverse as Windows and UNIX.

Likewise, LSS 20 provides a single interface for the distributed firewall to autonomic response systems, policy management for encryption, packet filtering, ID activity, traffic prioritization and content filtering based on the input from the response systems and services to each NIC 14 (such as ISAKMP and content filtering).

System 10, therefore, provides a response capability at each node in the network for responding to attacks quickly and accurately.

As noted above, in one embodiment, NICs 14 and device 30 are slaves in a master/slave architecture. In one such embodiment, each NIC 14 is formed from commercially available hardware with enhanced firmware. Hence, the incremental cost of adding another slave firewall is minimal, especially if systems are procured with firewall ready NICs. Each NIC is controlled by the LSS 20, not the host operating system. So, even if the host operating system is subverted by an insider or hostile code, the encryption and policy enforcement mechanisms on the NIC remain intact. Thus, the compromise of one machine within an enclave does not create a domino effect, giving an attacker access to all machines within the enclave.

In one embodiment, each NIC 14 implements one or more of the following functions: 1) IPSEC (Authentication Header and Encapsulation Security Protocol) processing; 2) Finely tuned packet filtering including shunting selected packets to LSS 20 for application layer processing; 3) Intrusion detection monitoring; and 4) QoS traffic prioritization. Each of these functions will be discussed below.

IPSEC

As more and more network traffic flows across Virtual Private Networks (VPNs) it takes increasing computing power to process the IPSEC packets that carry this traffic. Also, VPN traffic tunneled through a perimeter firewall makes it difficult to provide security controls at the perimeter firewall. ISAKMP policy and key management adds to the complexity of VPN management. In one embodiment, system 10 addresses this issue by providing ISAKMP management for an enterprise on the centralized LSS 20 and by performing IPSEC packet processing at each host using an enhanced NIC 14 or device 30.

Such an approach provides several advantages. First, the enhanced NIC's IPSEC hardware supports fast authentication, encryption, and decryption of IPSEC packets. This removes the need for IPSEC processing at a perimeter firewall in situations where neither authentication nor filtering needs to be done. It also makes it practical to provide end-to-end IPSEC VPNs (i.e., it extends the VPN through the perimeter firewall to the destination computer).

Second, the fact that each node added to system 10 contains its own cryptographic hardware means that throughput scales with the number of nodes.

Third, a centralized key management server such as LSS 20 can share keys with perimeter firewalls, which can then decrypt IPSEC traffic to perform authentication and/or content filtering of traffic passing through the firewall.

Fourth, the complex and sometimes computationally expensive tasks of public key processing and management is removed from the host, leaving it free to handle the data it is meant to process.

Fifth, the global view a centralized management system gives of an organization's VPN policies makes management easier and less prone to human error.

Packet Filtering

In one embodiment, each NIC 14 or device 30 serves as a packet filter for the local host. Such an approach takes advantage of the fact that each NIC is in a position to detect and control traffic that originates and terminates behind the traditional perimeter firewall. This is critical for operational environments where the probability of a bad insider is high.

In addition, as noted above, the performance of the distributed firewall scales up as the number of hosts increases. Thus, the performance bottleneck is eliminated.

The per-host nature of the distributed firewall allows the policy to be easily tuned to the needs of a specific host. For example, if no one should be Telneting to your web server, the NIC 14 associated with that web server can be configured to block both incoming and outgoing Telnet (from both inside and outside the organization).

In one embodiment, there are five options for each packet NIC 14 receives. The first option is for NIC 14 to allow the packet to be processed normally, either going to or from the host. The second option is for NIC 14 to deny the packet and drop it. The third option is for NIC 14 to queue the packet and send a request to its LSS20 for an applicable filter rule. The fourth option is for NIC 14 to redirect the packet to LSS 20 for higher level processing. The fifth option is to gather audit information for transmission to LSS 20. This can be connection state and traffic information or intrusion detection data. This last option may also be done in addition to any of the other options.

In one embodiment, filter rules are based on data such as policy flags (allow, deny, audit, redirect, etc.), traffic direction, source IP address, an IP address mask and port range for the source IP address, destination IP address, an IP address mask and port range for the destination IP address, protocol, redirect address and port and audit thresholds and counts.

Placing policy enforcement for a host on its Network Interface Card (NIC) 14 or device 30 has several additional advantages. First, enforcement is removed from the host operating system. If the host is compromised, the policy controlling network traffic to and from the host will still be enforced.

Second, some degree of platform independence is achieved, as the only requirement is that a host can support the NIC.

Third, policy enforcement is typically a simpler task than policy management. A complex policy management/enforcement system is more likely to have software bugs and vulnerabilities than a system that is dedicated to policy management or policy enforcement.

Intrusion Detection

In one embodiment, NIC 14 performs a limited amount of intrusion detection. For instance, intrusions with resulting IP layer anomalies can be checked for within the IP filtering stage. If an intrusion is detected at this level, in one embodiment NIC 14 or device 30 issues a message to LSS 20 indicating the attack.

Some of the attacks that can be detected at the TCP/IP stack level include IP fragment overlap attacks, out-of-band data attacks, ping of death attacks, forged TCP connections and TCP attacks.

IP fragment overlap attacks can cause system crashes, arbitrary TCP/UDP through firewall or denial of service. Out-of-band data attacks can cause service shutdown. TCP attacks such as invalid sequence number/window size, source routing, same source/destination on SYN or invalid RST sequence can cause denial of service and system compromise.

Finally, a forged TCP connection is an attempt to get data to the application layer without completing TCP connection setup.

In one embodiment, NIC 14 is configured with deny rules for the attack and will deny the packet. In another embodiment, when NIC 14 notifies LSS 20 of an intrusion detection, LSS 20 issues a command back to the NIC to deny/redirect subsequent packets.

Quality of Service

In one embodiment, NIC 14 performs flow control as a function of policy driven bandwidth management. When an operation is in progress, mission critical traffic is prioritized ahead of background traffic, such as Web browsing. A number of different approaches can be used for prioritization: 802.1p, packet filter rules, and ToS.

802.1p provides expedited traffic capabilities to support transmission of time-critical information in a LAN environment. 802.1p was developed by the IEEE and recently incorporated into a newly revised standard for 802.1D LAN Bridges (also known as Layer 2 switches). It provides expedited traffic capabilities to support transmission of time-critical information in a LAN environment. This technique for identifying and prioritizing traffic, uses traffic class values that are carried in a priority field of the packet header.

TABLE 1

IEEE 802.1p Priority Values and Associated Traffic Types

| Priority | Binary | Traffic Types |
|---|---|---|
| 7 | 111 | Network Control |
| 6 | 110 | Interactive Voice |
| 5 | 101 | Interactive Multimedia |
| 4 | 100 | Controlled Load Applications (Streaming Multimedia) |
| 3 | 011 | Excellent effort |
| 0 | 000 | Best Effort |
| 2 | 010 | Spare |
| 1 | 001 | Background |

Two NIC vendors who offer traffic prioritization based on IEEE 802.1p in their NDIS (or supplemental) drivers are 3Com and Intel. In one embodiment, these drivers are used to allow LSS 20 to insert priority tags and activate the drivers to establish high/low priorities, thus enabling the NIC to transmit/receive packets in the most efficient manner. Drivers from both companies support the multiple queue theory, at least one queue for high priority and low priority traffic. This ensures mission critical and delay sensitive traffic has priority over normal data.

In another embodiment, a "priority parameter" is added to the simple IP filter rules loaded on each NIC 14. When LSS 20 finds traffic levels are high (through one of the many traffic monitoring tools available today), it issues a new policy stating only traffic at a certain priority number will be transmitted/received.

In yet another embodiment, Type of Service (ToS) is used to prioritize messages. For example, the type of service octet in the Ipv4 header includes precedence bits defining seven different priority levels. In one embodiment, each NIC 14 and device 30 includes ToS processing. In such an embodiment, ToS is used by LSS 20 as an added QoS when ToS processing is present.

Application Filtering

In one embodiment, application filtering of suspicious traffic is performed by using an IP filtering rule to redirect the traffic to LSS 20 for filtering. In one such embodiment, redirection is done for authentication only during connection setup. In another embodiment, redirection is done for the duration of the session (i.e., for doing things like virus scanning).

The system 10 architecture allows for the optimum allocation of mechanisms within the distributed environment. Slow complex functions are performed on LSS 20, and faster simpler functions reside within NICs 14 and device 30.

In one embodiment, LSS 20 capabilities include intrusion detection and response interface (for interacting with ID&R systems), IP filter policy management, IPSEC key and policy management, replication, and application layer proxies and filters.

In addition, in one embodiment, LSS 20 provides an audit collection, storage and analysis facility. Since LSS 20 is a security critical component, in one embodiment LSS 20 is implemented on a hardened platform, such as a type-enforced firewall.

In one embodiment, each LSS 20 controls its associated NICs 14 through dedicated IPSEC tunnels. This protects the NIC policy control packets from manipulation and spoofing. The use of standard IPSEC for the tunnel means that the control messages are routable within the enterprise and on the Internet.

Intrusion Detection and Response

In one embodiment, LSS 20 acts as the ID&R coordinator. It collects intrusion detection alerts from multiple NICs 14 (and device 30) and forwards these to the appropriate ID&R systems. When an Intrusion Detection System (IDS) detects an intrusion or anomaly in the system, it sends an alert to LSS 20. In one such embodiment, one of the LSSs includes an alert analysis mechanism which interprets the alert and translates it into an intrusion response. In one embodiment, the intrusion response includes sending a command to one or more of the NICs 14 to perform actions such as terminating all existing connections to a remote IP address (or range of addresses), terminating all connections using a specified protocol/port number, or forwarding all packets from a specified IP address to LSS 20 for auditing and application layer filtering.

In one embodiment, the command is issued in the form of a new set of connection rules loaded to NIC 14 or device 30 for enforcement. In such an embodiment, LSS 20 is able to rapidly push out changes in policy to widely dispersed NICs 14 and device 30. The policy changes could be due to planned events (e.g., Time of Day restrictions) or emergency responses (e.g., a detected worm or virus).

ID&R systems are already available from commercial vendors and research organizations. In one embodiment, one or more of these commercially available ID&R systems will be used within system 10 to provide autonomic intrusion alerts.

IP Filter Policy Management

In one embodiment, filtering rules are downloaded from LSS 20 to each NIC encapsulated in UDP datagrams. In one such embodiment, each rule is numbered, since the policy on LSS 20 and NIC 14 and device 30 must match exactly, including rule order. As a rule is installed on the NIC a flag will be set in the rule record and the datagram will be echoed back to LSS 20 as an acknowledgement. A UDP datagram may contain multiple rules.

In one embodiment, each NIC 14 and device 30 includes a portion of non-volatile memory (NVM) protected from host manipulation. In such an embodiment, the filter rule set can be stored in NVM on the NIC and used as part of the initial NIC policy at system startup. On the other hand, if it is not possible to disable host access to portions of NIC memory, it is preferable for the filter rule set to be downloaded from LSS 20 at system startup. A policy check at system startup could validate the filter rules retrieved from NVM, but this would leave a small window open for malicious activity if an invalid filter policy is somehow inserted into NVM.

In one embodiment, LSS 20 requests that a NIC 14 or device 30 upload all of its filter rules as part of a system policy check. A transaction of this nature may require multiple UDP datagrams to transmit all data. In one such embodiment, the transaction request includes a unique transaction identifier so LSS 20 is able to identify returning datagrams as being associated with the request. In one embodiment, each NIC 14 or device 30 calculates the number of datagrams it will be sending in a transaction and includes this number as well as a datagram number in a payload header encapsulated with the filter rules. Such an approach allows LSS 20 to maintain the transaction state and ensure that the complete NIC filter rule set has been received.

IPSEC Key and Policy Management

In one embodiment, LSS 20 serves as the ISAKMP proxy. It establishes the security association, including applying the organization's policy for the particular host. LSS 20 then securely distributes the keying material to the NIC. This provides the following advantages. First, the NIC does not need to support expensive and complex public key operations. Second, the NIC/protected host does not need to be aware of PKI trust management, Certificate Revocation lists (CRLs), Online Certificate Status Protocol (OSCP) and constantly changing authorization policies.

In one such embodiment, IPSEC policies and keys are downloaded from LSS 20 to the NIC in the same manner as used for the IP filtering rules. The policy records may not initially have security association data included. As with IP filtering rules, if enough non-volatile memory is available and can be protected from host manipulation, an initial set of IPSEC policies can be read from NVM at system startup.

In one embodiment, each NIC checks its IPSEC policy before IP filtering rules are checked on incoming packets and after the IP filter check on outgoing packets. If a matching IPSEC policy is found and valid IPSEC keys aren't present, the packet is queued and a security association request is sent to LSS 20. LSS 20 then formats the data and requests IPSEC keys for the security association from an ISAKMP daemon running on LSS 20 host. When the keys have been generated, LSS 20 downloads them to the NICs on both ends of the security association.

In one embodiment, IPSEC policy information can be read by LSS 20 as part of a system policy check. In one such embodiment, policy records are uploaded in the same manner as IP filter rules are uploaded.

In one embodiment, communication between the NIC and LSS 20 is encrypted using IPSEC policy data defined at installation. During manual NIC configuration the address of LSS 20 and preshared IPSEC keys are entered. This data is then stored in protected non-volatile memory, if available. It can then be accessed during NIC power up and used to initiate communications with LSS 20.

In one embodiment, the ISAKMP daemon used on Secure Computing's Sidewinder firewall is modified to provide the interface to LSS 20. In one such embodiment, normal processing of negotiations with other ISAKMP daemons is preserved.

Figure 6:
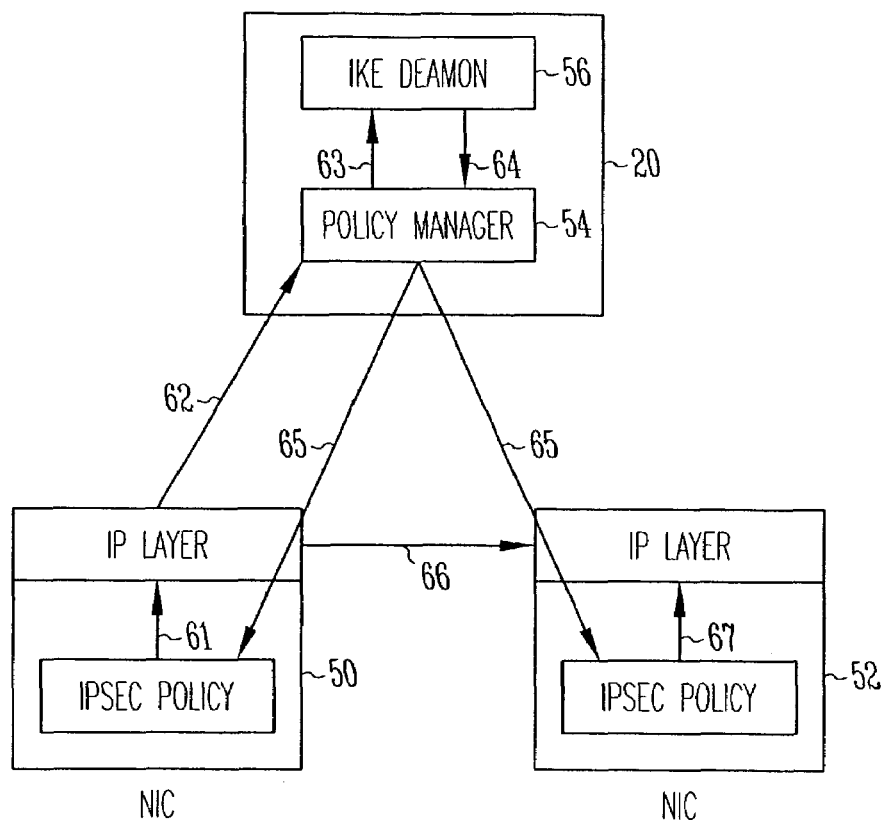
FIG. 6 illustrates one embodiment of an IPSEC key exchange protocol used for encrypted communication between two policy enforcing network interface devices.

The IPSEC key exchanges required for encrypted communication between two policy enforcing NICs is illustrated in FIG. 6. As can be seen in FIG. 6, in one embodiment, the IPSEC policy on the source NIC 50 is checked at 61 during IP packet processing. In the embodiment shown in FIG. 6, a policy exists, but there is no current security association. At 62, a security association request is sent from NIC 50 to LSS 20. At 63, LSS policy manager 54 forwards the security association request to local ISAKMP daemon 56. At 64, ISAKMP daemon 56 returns the security association data for NICs 50 and 52. Policy manager 54 downloads the security association data to both NICs at 65. Source NIC 50 uses the security association data, at 66 to encrypt packets sent to destination NIC 52. Finally, at 67, destination NIC 52 has the required policy and security association data in place to communicate with source NIC 50 over the IPSEC connection.

Local Security Server Redundancy In some of the embodiments of system 10 architecture described above, LSS 20 represents a single point of failure. To address this, in one embodiment, a redundant LSS 20 serves as a secondary LSS which can be used to serve as the primary LSM if need be. Such an embodiment is shown in FIG. 5 as discussed above.

In one embodiment, if a NIC's primary LSS becomes unreachable, the NIC switches to the next in a list of available LSS hosts. This list is contained in the system policy that is downloaded to the NIC from LSS 20.

In one embodiment, LSS 20 maintains the set of policies that are currently deployed to the various NICs in system 10. To support redundancy, these policies must be sharable among all of LSS 20s. To accomplish this, in one embodiment, system 10 uses Directory Services (DS), a concept which is commercially supported by NetWare (NDS), Netscape (Directory Server), and is in development at Microsoft (Active Directory). Directory Services provide their own replication capability, which greatly simplifies the work necessary to provide redundant LSSs.

The concept of managing networks from information stored in the DS is endorsed by all the major network vendors through the Directory Enabled Networks (DEN) initiative for policy (including security) based networking. DEN is an initiative by the Distributed Management Task Force which was originally spearheaded by CISCO and Microsoft, but is also supported by many of the leading networking companies. This initiative has developed a specification for directory enabled networks. The specification defines a directory schema to provide a common taxonomy and organization for network elements (routers, switches, etc.) and the policies required to manage them. With DEN, a directory service becomes the repository for information regarding these networking devices, their profiles, configuration information, interactions between them and policies they support/enforce. DEN specification extends the directory schema by defining a set of data models for typical network devices and their properties (policies) and by defining a standard way for storing this information within the directory tree.

This directory schema could be extended to include firewalls and security enabled NICS. Hence, this approach has the additional advantage that eventually LSS 20 may be able to manage other network components through the DS and provide a broader autonomic response capability.

In one embodiment, security policies are integrated within the DS tree structure and made visible and accessible throughout the DS tree like all other DS entries, within defined access permissions. The DS entries that contain the ADF policy information will need to conform to accepted DS tree structures for organizations, users, equipment, policies, and so on.

Since all available DS's may continue to be susceptible to attacks, data requiring extra security should reside not on the DS, but inside "vaults", such as a SafeWord Authentication Server mounted on a Type Enforced Sidewinder. In such an embodiment, the DS acts as a proxy (placeholder) for the data and would contain a pointer to where the data actually resides. Access to the "vaulted" data would be controlled by policies residing in the vault itself and access to this data would require more stringent security checks (such as re-authentication) than access to the DS.

In one embodiment, LSS 20s use the LDAP protocol for communication with the directory. An LSS 20 can query any DS server or any vault directly using LDAP. A request could be forwarded via a proxy request from any DS server or vault to other vaults or DS's, or a pointer to a specific vault could be returned to the requester. Communication between LSS 20 and the DS is protected either by LDAP over SSL or IPSEC.

Management of Local Security Server 20

Figure 7:
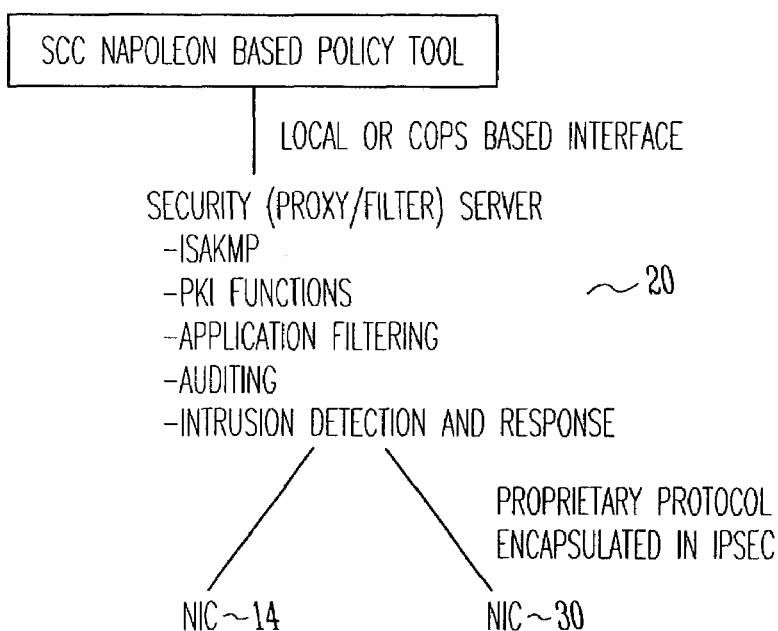
FIG. 7 illustrates one embodiment of a role based access control mechanism with a GUI interface to control LSS 20.

LSS 20 can be managed in a number of ways. For instance, in one embodiment, First, LSS 20 may be configured in a stand-alone mode that uses a role based access control mechanism with a GUI interface to control LSS 20. This allows system 10 to be controlled independently. Such an architecture is shown in FIG. 7, where a policy tool 70 communicates with LSS 20 over a local interface or over an IETF Common Open Policy Service (COPS) based interface.

Figure 8:
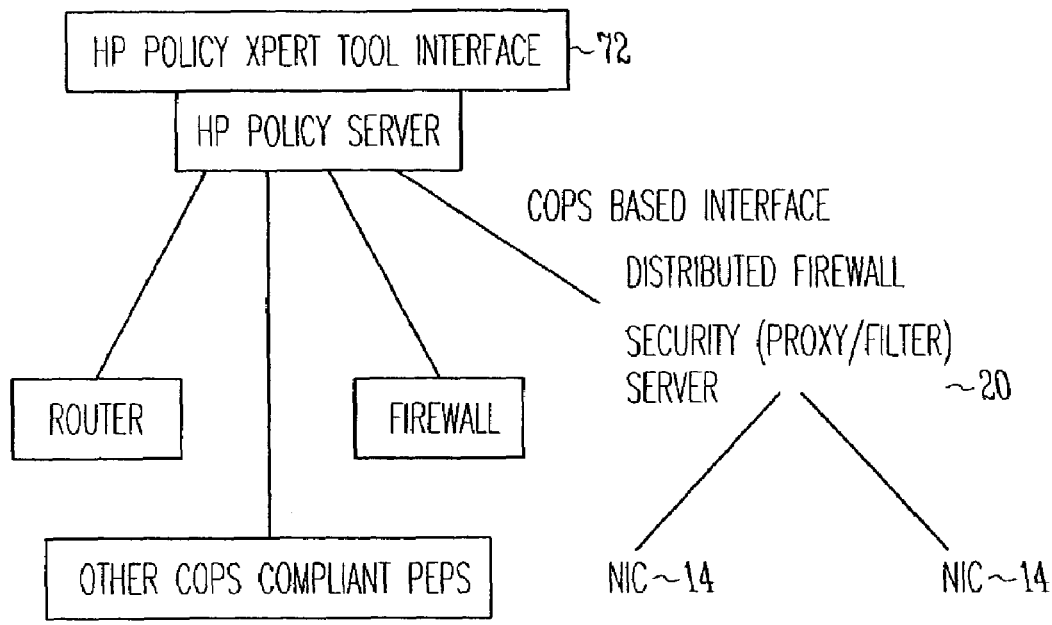
FIG. 8 illustrates another control mechanism for system 10.

For larger installations, particularly those integrated with other policy enforcing devices, the IETF Common Open Policy Service (COPS) protocol is more appropriate. This allows LSS 20 to serve as a COPS proxy between a management station 72 and the NICs 14 as shown in FIG. 8.

Operation of the Distributed Firewall

System 10 is capable of supporting a number of different operations. Dynamic VPN establishments will be described first.

Figure 9:
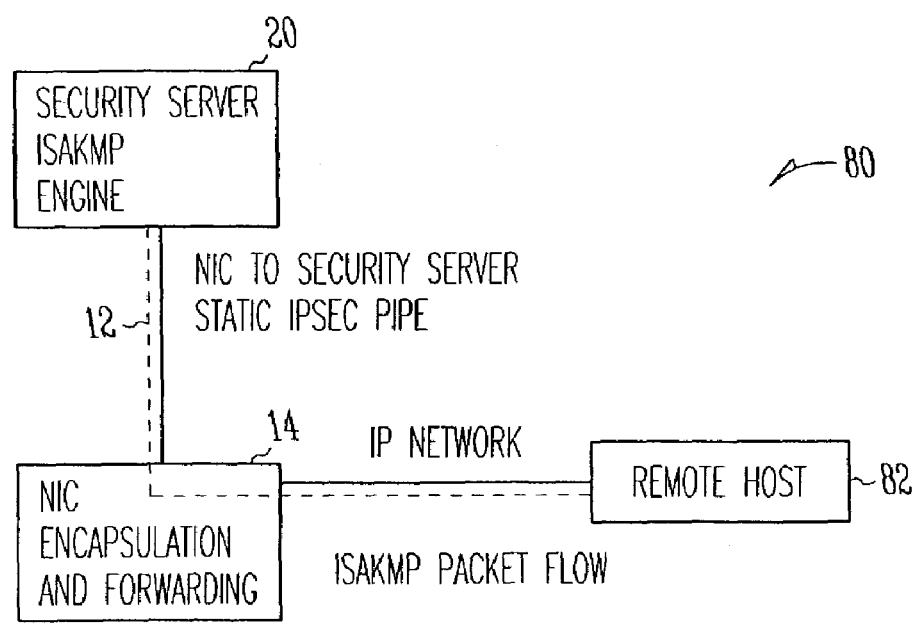
FIG. 9 illustrates one approach to establishing a virtual private network.

The flow of packets during the establishment of a dynamic VPN 80 is illustrated in FIG. 9, where secure server 20 communicates through its NIC 14 to a remote host 82.

In one embodiment, key and policy management are controlled through server 20. The use of proxies for establishing IPSEC security associations is supported in the IPSEC architecture. The use of remote servers to perform security operations (e.g., RADIUS) is also well established. In one embodiment, NIC 14 uses LSS 20 as a remote server to perform ISAKMP processing including public key infrastructure processing and the application of the organizations policy.

Distributed firewall system 10 can be used to establish expectations at the time of connection establishment. In one embodiment, when a connection is established the parties to the connection perform authentication, identify the services required (e.g., HTTP but not Telnet), apply the policy to make an authorization decision, then generate the enforcement rule set. This rule set is loaded into the enforcement engine running on NIC 14.

In one embodiment, dynamic VPN 80 uses IP encapsulation to protect data being transferred through network 12. In one embodiment, protocols such as IPX are encapsulated in IP packets to allow them to be tunneled across IP networks. In such an embodiment NIC 14 and LSS 20 encapsulate the ISAKMP packets in the static NIC-LSS IPSEC pipe. This allows the NIC to forward ISAKMP packets to LSS 20 over any IP routable network.

Use of system 10 to respond to intrusion will be discussed next. Both NIC 14 and workstation 16 (the host for NIC 14) may generate intrusion alerts and send them to an intrusion detection response coordinator such as LSS 20. If LSS 20 determines that the host 16 containing policy enforcing NIC 14 is compromised, LSS 20 may send the NIC 14 associated with host 16 an intrusion response control command.

The intrusion response control command may tell NIC 14 to terminate all existing connections to a remote IP address (or range of addresses) and block future connections, to terminate all connections using the specified protocol/port number, or to forward all packets from a specified IP address to LSS 20 for auditing and application layer filtering.

In one embodiment, NIC 14 receives policy commands only from LSS 20. Therefore, even if the attacker had taken over host 16, the host can be quarantined so that it is not used to launch attacks inside or outside the organization.H.323 UDP packet filtering will be discussed next. When a remote entity attempts to establish an H.323 session with a NIC 14 protected host, the NIC recognizes that the connection must be authenticated and authorized. In one embodiment, NIC 14 forwards the connection establishment packets to LSS 20 (much like in the ISAKMP example above). When the security server has performed its processing, it sends the packets back to the NIC. These filtered packets are then passed into the host to be acted upon by the unmodified H.323 application.

Packets sent from the H.323 application on the NIC protected host are also sent to LSS 20 for filtering, then they are returned to the NIC to be sent to the remote entity via the NIC. When the connection establishment process is complete, LSS 20 sends the packet filtering rules to the NIC. The NIC may then apply the policy locally to the data stream without forwarding the data stream to LSS 20.

Figure 10:
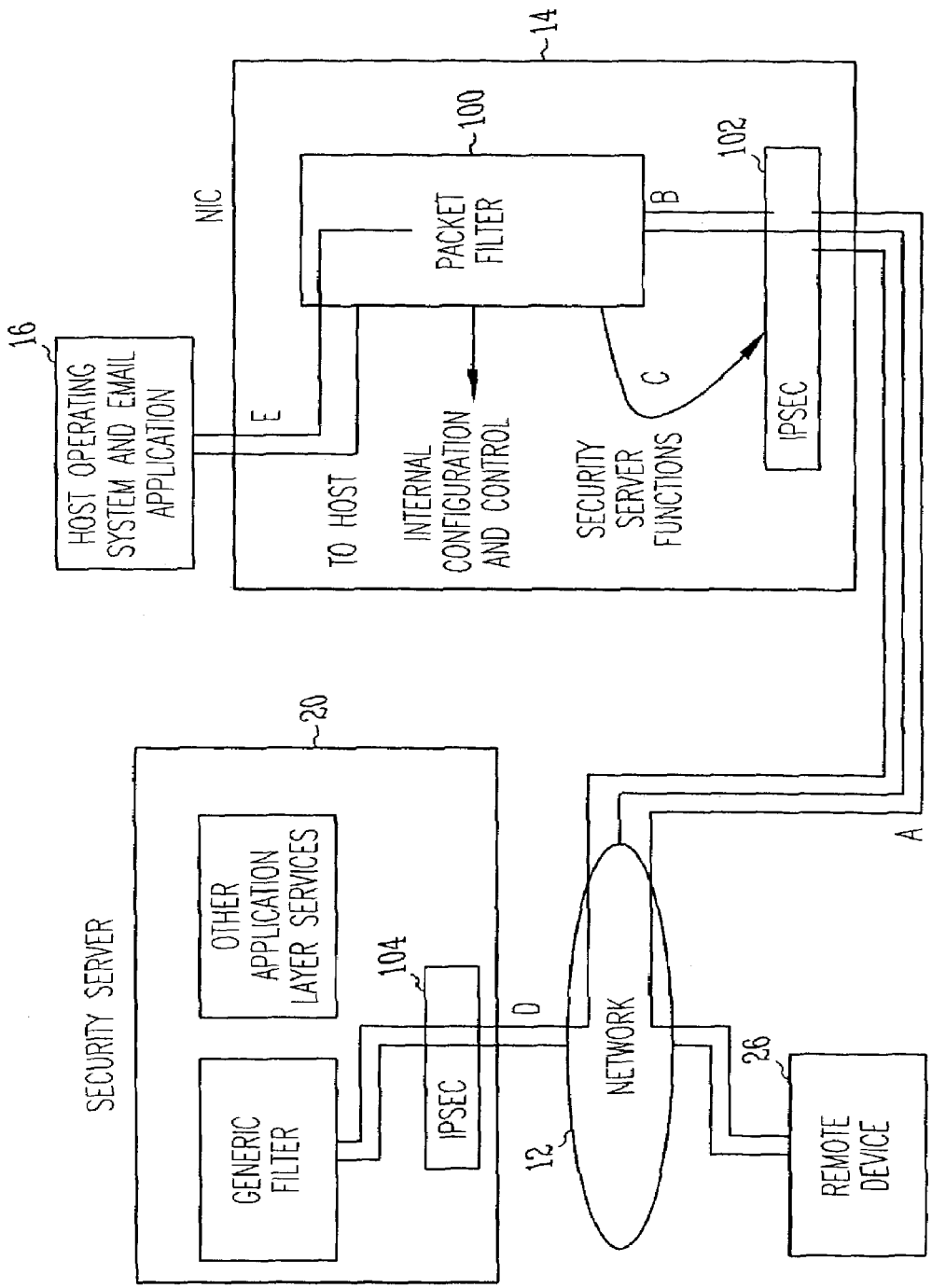
FIG. 10 illustrates one approach to implementing a generic proxy capability according to the present invention.

Operation of system 10 will be discussed next. FIG. 10 illustrates how a generic proxy capability may be implemented using the invention. Packets arrive at NIC 14 and device 30 over network 12 over path A. If the packets are IPSEC packets, they are decrypted at 102 and sent to packet filter 100 via path B. (If the packets are not IPSEC packets, they are simply sent to packet filter 100 via path B.)

Packet filter 100 determines if the packet should be sent to host 16 or if it needs to be sent to security server 20. If the packet is to go to security server 20, it is sent via path C to the IPSEC module 104. This module provides IPSEC protection for packets moving between NIC 14 and security server 20 and between device 30 and security server 20. The packets are then sent to security server 20 via path D.

IPSEC module 104 in security server 20 performs IPSEC processing on the received packet then sends it to the appropriate service module on security server 20. After the module or modules on security server 20 have processed the packet, the result is sent back to NIC 14 or to device 30 within remote device 26. This result is protected using the IPSEC module on the security server and then sent to NIC 14 via path D.

NIC 14 performs the IPSEC processing on the received packet then sends it to packet filter 100 via path B. Packet filter 100 then routes the packet to the appropriate destination. In one embodiment, the destinations include across the network to another device 26, to NIC 14 or device 30 internal configuration and control or to host 16.

Figure 11:
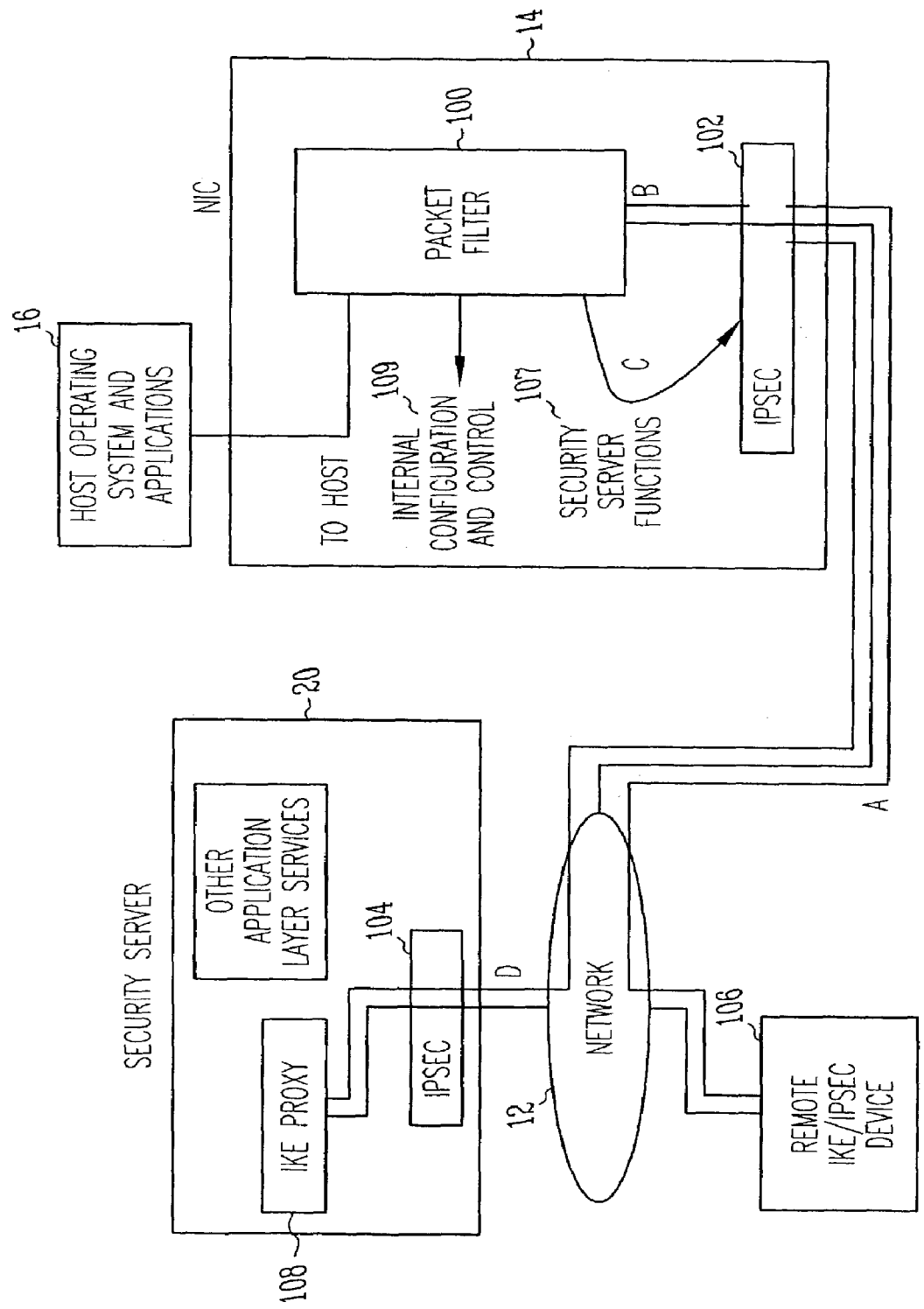
FIG. 11 illustrates one embodiment of a remote Internet Key Exchange (IKE) function according to the present invention.

FIG. 11 illustrates one way to provide a remote Internet Key Exchange (IKE) function according to the present invention. In one embodiment, a remote IKE/IPSEC device 106 attempts to connect to a host 16 containing distributed firewall NIC 14 over path A. NIC 14 performs IPSEC processing on the packet if it is IPSEC encrypted then passes the plaintext packet to packet filter 100 via path B. Note that the packets being transferred from the remote device to NIC 14 are not IPSEC encrypted.

Packet filter 100 examines the packet and determines if it is an IKE packet from a device other than security server 20. If so, packet filter 100 internally redirects the IKE packet to the "security server functions" of NIC 14 via path C. The security server functions processing attaches additional information to the packet and sends the packet to IPSEC function 102 for encryption. In one embodiment, NIC 14 and security server share 20 a cryptographic key which is used to protect security server to NIC traffic.

The packet is then encrypted and sent to security server 20 via path D, where the security server performs IPSEC decryption then passes the packet up to IKE proxy 108. In one embodiment, IKE proxy 108 performs the IKE processing for the host associated with NIC 14 and generates the appropriate IKE response packet. Security server 20 then attaches additional information to the packet and sends it to NIC 14 via the IPSEC protected path.

NIC 14 receives the packet, determines it is from security server 20 and decrypts it. The packet is then sent to packet filter function 100, which determines how to route the packet within NIC 14, and from there the packet is sent to the security server functions processing 107, which routes the packet over network 12 to remote IKE/IPSEC device 106 via path A. Remote device 106 receives the IKE packet from NIC 14 and processes it.

Remote device 106 and NIC 14 continue exchanging IKE packets until the information necessary for the security association has been established. The IKE proxy within security server 20 sends the information for the IPSEC security association to NIC 14 via the security server/NIC IPSEC path D. Packet filter 100 in NIC 14 recognizes the packet type and sends it to the internal configuration and control processing 109. This processing makes the security association information for NIC 14/remote device association available for the IPSEC processing function.

In one embodiment, the fact that the distributed firewall device (NIC 14) used security server 20 for processing is transparent to remote IKE/IPSEC device 106. Thus, the distributed firewall IKE/IPSEC device is interoperable with standard IKE/IPSEC devices.

Figure 12:
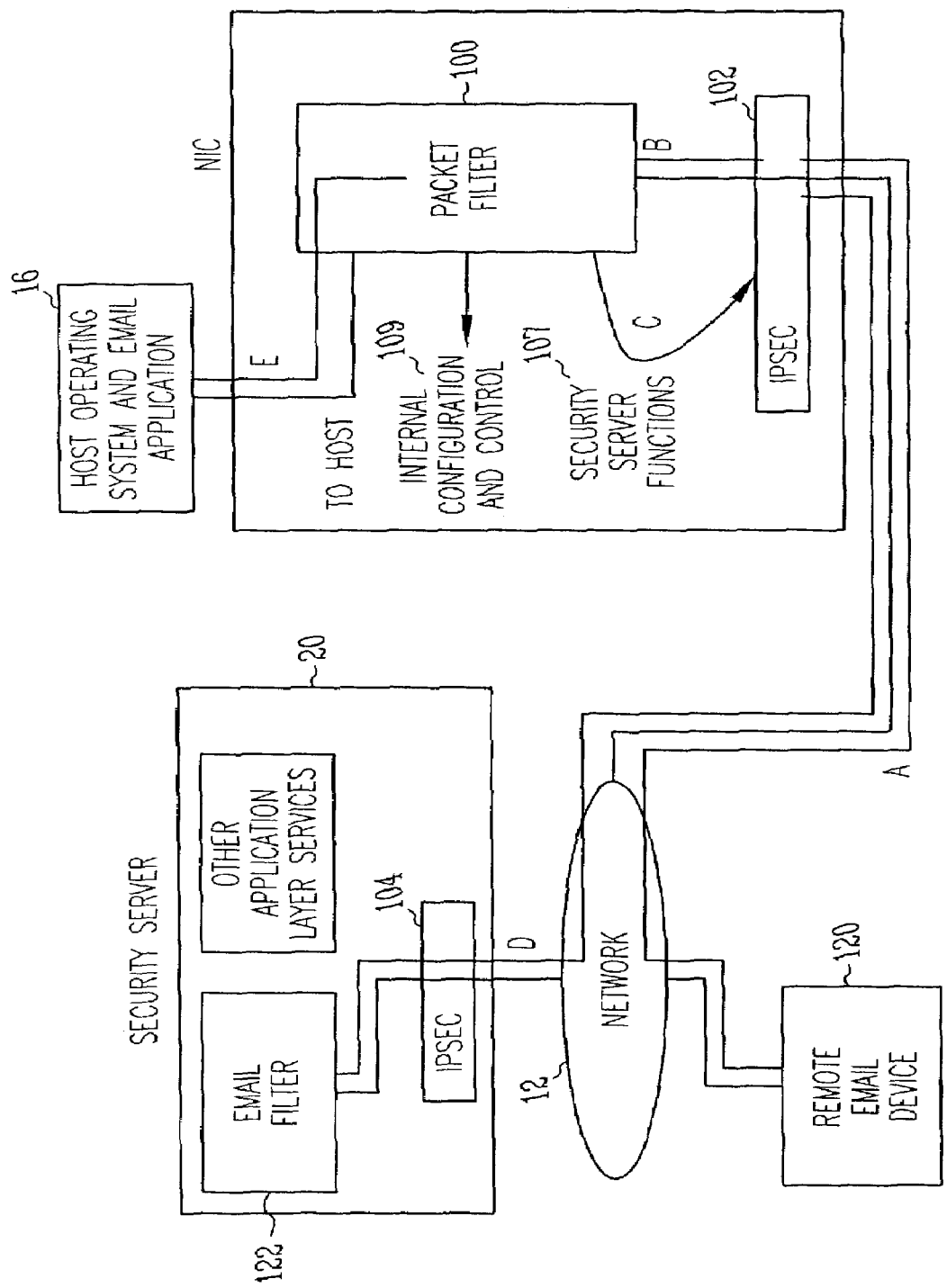
FIG. 12 illustrates one embodiment of a remote email filtering function according to the present invention.

FIG. 12 illustrates one embodiment of a remote email filtering function according to the present invention. This function might be used, for instance, to filter incoming email to detect viruses. Its operation will be discussed next.

Remote email device 120 initiates the process by attempting to connect to a host 16 containing the distributed firewall NIC 14. Communications from remote email device 120 to host 16 follows path A to NIC 14. NIC 14 performs IPSEC processing on the packet (if it is IPSEC encrypted). This is independent of the mail filtering function. NIC 14 then passes the plaintext packet to packet filter 100 via path B.

Packet filter 100 examines the packet and determines if it is an email packet from a device other than security server 20. If so, packet filter 100 internally redirects the email packet to the security server functions processing 107 via path C.

Security server functions processing 107 attaches additional information to the packet and sends the packet to IPSEC function 102 for encryption. (In one embodiment, NIC 14 and security server 20 share a cryptographic key which is used to protect security server-to-NIC traffic.) The packet is encrypted and sent to the security server via path D.

Security server 20 performs IPSEC decryption then passes the packet up to an email filter 122. In one embodiment, email filter 122 performs the email filtering according to the policy specified on security server 20. This may include checking attachments for a virus or other unauthorized content. Security server 20 generates the filtered mail packet and sends it back to NIC 14 via path D, which is IPSEC protected.

NIC 14 receives the encrypted email packet, determines if it is from the security server and decrypts it. The packet is then sent to packet filter function 100 (via path B) which determines how to route the packet within NIC 14. The packet is then sent to the host operating system and email application via path E. Host 16 process the packet as though it came directly from remote email device 120.

In one embodiment, the email proxy may also be invoked for email messages being sent from host 16. In this case, the mail would go from NIC 14 to security server 20, to NIC 14, and then to remote mail device 120.

In one embodiment, packet filter 100 is configured using packet filter enforcement vectors supplied by LSS 20. In one such embodiment, packet filter 100 within NIC 14 applies filters to incoming/outgoing packets and takes action based upon the filtering results.

In one embodiment, packet filter 100 disposes of an incoming packet in one of four ways: 1) allow the packet through to the host; 2) deny the packet (host unreachable); audit the packet (this allows insiders to get their job done but allows auditors to detect abuse); and 4) shunt the packet to LSS 20 for application layer proxy support. In one such embodiment, each packet filter 100 filters packets as a function of source IP address, destination IP address, source port and destination port. In one embodiment enforcement vectors stored in NIC 14 tell packet filter 100 the rules (source address, destination address, etc.) and the action to take if the packet matches the filtering rules. The enforcement vectors are passed from LSS 20 to NIC 14 across path D.

The distributed nature of system 10 provides a greater degree of protection against threats from outsiders. In addition, distributing the firewall services among NIC 14 and device 30s reduces the threat of a domino attack if an attacker is able to gain access to a machine within the perimeter. That is, the distributed nature of the firewall makes it considerably more difficult for an attacker to launch secondary attacks from a compromised machine. Another benefit is that the low cost nature of NIC 14 and device 30s makes it practical to extend firewall services to small offices and home offices. Finally, as is noted above, the distributed firewall can be used to create and enforce workflows (assure pipelines) within an intranet or extranet.

Figure 13:
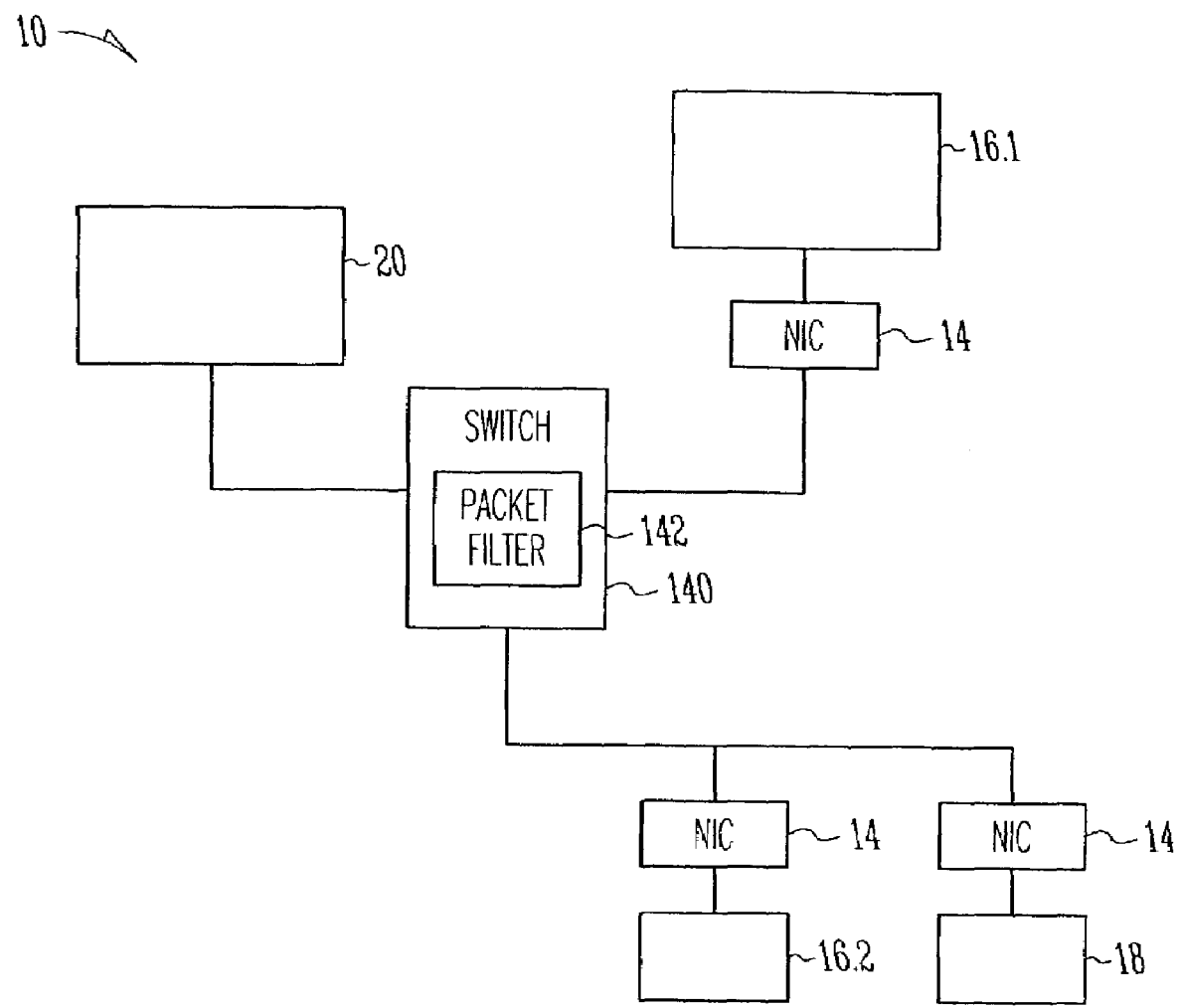
FIG. 13 illustrates yet another embodiment of a distributed firewall system.

FIG. 13 illustrates yet another embodiment of a distributed firewall system 10. In one such embodiment network interface cards (NICs) 14 provide an interface between workstations 16 and network 12 and between servers 18 and network 12. System 10 also includes a local security server (LSS) 20 connected to network 12. Network interface cards 14 provide a host-based response and enforcement mechanism while local security server 20 provides centralized management of NICs 14 and a single system interface to intrusion detection and response systems.

In contrast to the embodiments of system 10 discussed above, in the embodiment shown in FIG. 13, a router 140 is part of distributed firewall 10. That is, although each system 10 described above may include one or more routers, they are simply routers. They have no part in the distributed firewall system.

In the embodiment shown in FIG. 13, one or more routers 140 of system 10 includes a packet filter 142 which operates under the control of LSS 20 to filter packets passing through router 140. A security policy can, therefore, be mapped (e.g., by LSS 20) to the appropriate firewall components. For instance, packet filter 142 may be configured as a packet filter for filtering traffic between computer 16.1 and both computer 16.2 and server 18. Such an approach may be advantageous when, for instance, packet filter 142 has a greater throughput capability than NICs 14.

In the above discussion, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of restricting packet transfer to a computer across a network, wherein the computer includes a network interface device coupled to the network and wherein the network interface device includes a packet filter, the method comprising:
   providing a security server connected to the network;
   receiving a packet at the network interface device;
   determining, at the network interface device, whether the packet is a previously authorized transaction;
   if the packet is not a previously authorized transaction, routing the packet to the security server;
   determining, at the security server, whether the packet is an authorized transaction; and
   if the security server determines that the packet is an authorized transaction, configuring the network interface device to accept similar transactions.

2. The method according to claim 1, wherein determining whether the packet is an authorized transaction at the security server includes authenticating the source of the packet.

3. The method according to claim 1, wherein configuring includes filtering the packet using a packet filter.

4. The method according to claim 3, wherein filtering includes applying quality of service policies to the packet.

5. The method according to claim 1, wherein configuring includes initiating end-to-end IPSEC for similar transactions.

6. The method according to claim 1, wherein configuring includes encrypting a packet to be transferred to the network interface device, transferring the encrypted packet to the network interface device, decrypting the encrypted packet at the network interface device, and configuring the network interface device as a function of the decrypted packet.

7. The method according to claim 1, wherein determining whether the packet is an authorized transaction at the security server includes configuring the network interface device to reject similar transactions if the packet is not an authorized transaction.

8. The method according to claim 1, wherein determining whether the packet is an authorized transaction at the security server further includes configuring other network interface devices to reject similar transactions if the packet is not an authorized transaction.

9. An article comprising a computer readable medium having instructions thereon, wherein the instructions, when executed in a computer, create a system for executing the method of claim 1.

10. A method of restricting packet transfer from a computer across a network, wherein the computer includes a network interface device coupled to the network and wherein the network interface device includes a packet filter, the method comprising:
providing a security server connected to the network;
receiving a packet at the network interface device;
determining, at the network interface device, whether the packet is a previously authorized transaction;
if the packet is not a previously authorized transaction, routing the packet to the security server;
determining, at the security server, whether the packet is an authorized transaction; and
if the security server determines that the packet is an authorized transaction, configuring the network interface device to permit similar transactions.

11. The method according to claim 10, wherein determining, at the network interface device, whether the packet is a previously authorized transaction includes comparing the source address to the host address.

12. The method according to claim 10, wherein determining whether the packet is an authorized transaction at the security server includes authenticating the source of the packet.

13. The method according to claim 10, wherein configuring includes filtering the packet using a packet filter.

14. The method according to claim 13, wherein filtering includes applying quality of service policy to the packet.

15. The method according to claim 10, wherein configuring includes initiating end-to-end IPSEC for similar transactions.

16. The method according to claim 10, wherein configuring includes encrypting a packet to be transferred to the network interface device, transferring the encrypted packet to the network interface device, decrypting the encrypted packet at the network interface device, and configuring the network interface device as a function of the decrypted packet.

17. The method according to claim 10, wherein determining whether the packet is an authorized transaction at the security server includes configuring the network interface device to reject similar transactions if the packet is not an authorized transaction.

18. The method according to claim 10, wherein determining whether the packet is an authorized transaction at the security server further includes configuring other network interface devices to reject similar transactions if the packet is not an authorized transaction.

19. An article comprising a computer readable medium having instructions thereon, wherein the instructions, when executed in a computer, create a system for executing the method of claim 10.

20. A method of limiting source spoofing in the transfer of packets from a computer across a network, wherein the computer includes a processor and a network interface device coupled between the processor and the network, wherein the computer has a computer address and wherein the network interface device includes a packet filter, the method comprising:
preparing a packet having a source address and a destination;
transferring the packet from the processor to the network interface device;
examining the packet within the network interface device, wherein examining includes comparing the source address to the computer address;
if the source address matches the computer address, transferring the packet across the network to the destination;
if the source address does not match the computer address, preventing the packet from being transferred across the network to the destination and, instead, forwarding the packet to a security server;
receiving, at the network interface device, a message from the security server, wherein the message includes authorization information corresponding to a packet previously sent from the network interface device to the security server; and
wherein the authorization information configures the network interface device to accept transactions similar to the packet previously sent from the network interface device to the security server.

21. The method of claim 20, wherein forwarding includes encrypting the packet and transferring the encrypted packet to the security server.

22. An article comprising a computer readable medium having instructions thereon, wherein the instructions, when executed in a computer, create a system for executing the method of claim 20.

23. A computer system, comprising:
a network;
a computer connected to the network through a network interface device; and
a security server;
wherein the network interface device includes logic for transmitting information from the network interface device to the security server independent of the computer and wherein the security server configures the network interface device as a function of the transmitted information.

24. The system of claim 23, wherein the logic includes an encryption circuit for encrypting data to be transferred from the network interface device to the security server.

25. The system of claim 23, wherein the security server includes means for authenticating a user to the system.

26. The system of claim 23, wherein the security server includes audit analysis.

27. A computer system, comprising:
a network;
a computer connected to the network;
a router connected to the network, wherein the router includes a packet filter; and
a security server connected to the router over the network;
wherein the router receives packets from the network, filters the packets using the packet filter to detect unauthorized packets and transmits unauthorized packets over the network to the security server independent of the computer; and
wherein the security server configures the router packet filter after analysis of the unauthorized packets.

28. The system of claim 27, wherein the router includes an encryption circuit for decrypting encrypted packets and for encrypting the decrypted packets before forwarding them to their destination.

29. The system of claim 28, wherein the security server includes an encryption circuit and wherein communication from the security server to the router can be encrypted by the security server's encryption circuit.

30. The system of claim 27, wherein the security server includes means for authenticating a user to the system.

31. The system of claim 27, wherein the security server includes audit analysis.

32. A computer system, comprising:
   a network;
   a computer connected to the network through a network interface device; and
   a security server capable of communicating with the network interface device;
   wherein the network interface device includes a packet filter, wherein the packet filter includes quality of service control for managing traffic flowing through the network interface device; and
   wherein the security server transfers configuration information to the network interface device to modify quality of service parameters on the network interface device as a function of changing security conditions within the computer system.

33. The system of claim 32, wherein the network interface device further includes an encryption circuit for encrypting data to be transferred from the network interface device to the security server.

34. The system of claim 32, wherein the security server includes means for authenticating a user to the system.

35. The system of claim 32, wherein the computer system further comprises a router having a packet filter, wherein the packet filter includes quality of service control for managing traffic flowing through the router and wherein the security server transfers configuration information to the router to modify quality of service parameters on the router as a function of changing security conditions within the computer system.

36. A distributed firewall system, comprising:
   a plurality of computers, including a first computer, wherein the plurality of computers are connected through network interface cards to a network; and
   a security server connected to the network;
   wherein the network interface card for the first computer includes logic which selectively forwards packets addressed to the first computer from the network interface card to the security server;
   wherein the security server determines whether the packet is an authorized transaction; and
   wherein if the server determines that the packet is an authorized transaction, the security server configures the network interface device to accept similar transactions.

37. The system according to claim 36, wherein the network interface card for the first computer includes encryption and decryption logic.

38. The system according to claim 37, wherein the security server includes encryption and decryption logic, wherein the encryption and decryption logic encrypts packets to be transferred to the network interface card for the first computer.

39. The system according to claim 36, wherein the network interface card for the first computer includes a packet filter and wherein the packet filter detects packets to be forwarded to the security server.

40. The system according to claim 36, wherein the network interface card for the first computer includes encryption and decryption logic and wherein the packets to be forwarded to the security server are encrypted on the network interface card before being transmitted to the security server.

41. A method of providing computer security services to the computer of a remote user, comprising:
   providing a security server;
   installing a network interface device in the computer, wherein the network interface device includes logic for transmitting information from the network interface device to the security server independent of the computer;
   transmitting information from the network interface device to the security server; and
   configuring the network interface device as a function of the information transmitted from the network interface device to restrict packet transfer through the network interface device.

42. The method of claim 41, wherein transmitting includes initiating a session, wherein initiating a session includes authenticating the user to the security server; and
   wherein configuring the network interface device includes restricting packet transfer as a function of the user.

43. The method of claim 41, wherein the network interface device includes a packet filter and wherein configuring the network interface device includes transferring packet filtering rules from the security server to the network interface device, wherein transferring includes modifying the packet filtering rules as a function of changing security conditions.

44. The method of claim 41, wherein the network interface device includes a packet filter, wherein the packet filter includes quality of service control for managing traffic flowing through the network interface device; and
   wherein configuring the network interface device includes transferring information from the security server to the network interface device modifying quality of service parameters on the network interface device as a function of changing security conditions.

45. An article comprising a computer readable medium having instructions thereon, wherein the instructions, when executed in a computer, create a system for executing the method of claim 41.

\* \* \* \* \*

UNITED STATES PATENT AND TRADEMARK OFFICE
CERTIFICATE OF CORRECTION

PATENT NO. : 7,536,715 B2 Page 1 of 1
APPLICATION NO. : 10/304469
DATED : May 19, 2009
INVENTOR(S) : Thomas R. Markham It is certified that error appears in the above-identified patent and that said Letters Patent is hereby corrected as shown below:

On the Title Page, item [56]

On page 2, in column 2, under "Other Publications", line 2, delete "13." and insert -- 13 pgs. --, therefor.

On page 2, in column 2, under "Other Publications", line 39, delete "Priviate" and insert -- Private --, therefor.

On page 2, in column 2, under "Other Publications", line 61, delete "2008, 12 pgs.'"" and insert -- 2008", 12 pgs. --, therefor.

On sheet 7 of 11, Figure 8, Reference Numeral 72, line 1, delete "XPERT" and insert -- EXPERT --, therefor.

In column 1, line 32, delete "merchants" and insert -- merchants. --, therefor.

In column 14, line 20, delete "requester." and insert -- requestor. --, therefor.

In column 21, line 43, in Claim 36, delete "the" and insert -- the security --, therefor.

Signed and Sealed this

Twenty-first Day of July, 2009

JOHN DOLL
*Acting Director of the United States Patent and Trademark Office*